United States Patent [19]
Orikasa et al.

[11] Patent Number: 6,144,491
[45] Date of Patent: *Nov. 7, 2000

[54] REFLECTION-TYPE PROJECTION SCREEN

[75] Inventors: Toshiyuki Orikasa; Eiichiro Yokochi; Kazuko Eto, all of Tokyo-To, Japan

[73] Assignee: Dai Nippon Printing Co., Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/807,031

[22] Filed: Feb. 26, 1997

[30] Foreign Application Priority Data

| Feb. 29, 1996 | [JP] | Japan | 8-042449 |
| Sep. 13, 1996 | [JP] | Japan | 8-243279 |
| Sep. 30, 1996 | [JP] | Japan | 8-258783 |

[51] Int. Cl.[7] .................................................. G03B 21/60
[52] U.S. Cl. ............................................. 359/452; 359/459
[58] Field of Search ................................. 359/452, 443, 359/454, 459

[56] References Cited

U.S. PATENT DOCUMENTS

| 4,006,965 | 2/1977 | Takada et al. | 350/117 |
| 4,431,720 | 2/1984 | Sugarman | 430/17 |
| 4,519,686 | 5/1985 | Seki et al. | 354/200 |
| 4,911,529 | 3/1990 | Van De Ven | 350/127 |
| 5,196,960 | 3/1993 | Matsuzaki et al. | 359/453 |
| 5,361,163 | 11/1994 | Matsuda et al. | 359/452 |
| 5,456,967 | 10/1995 | Nezu | 428/141 |

FOREIGN PATENT DOCUMENTS

| 30811 | 3/1914 | Japan . |
| 64-40835 | 3/1989 | Japan . |
| 4-53945 | 2/1992 | Japan . |
| 5-88263 | 4/1993 | Japan . |

*Primary Examiner*—Russell Adams
*Assistant Examiner*—Christopher E. Mahoney
*Attorney, Agent, or Firm*—Parkhurst & Wendel, L.L.P.

[57] ABSTRACT

A reflection-type projection screen includes a substrate, a light-reflecting layer made from a transparent resin in which flakes of a light-reflective material are dispersed, and a transparent light-diffusing layer made from a transparent resin in which fine crystalline particles of calcite and an achromatic dye or pigment are dispersed. The surface of the light-diffusing layer functions as a projection-light-receiving, image-observation surface which receives the incident projection light and on which an image to be observed is formed. A lubricant can be incorporated into the light-diffusing layer. The calcite particles slightly absorb light and have moderate light-diffusing properties. As a result, the transmittance of the light-diffusing layer is increased. The light-reflecting layer has a high reflectance. Due to the synergistic effect of the properties of the two layers, the projection screen has a high reflection luminance (high gain). Furthermore, due to the light-diffusing effect of the calcite particles and the flakes, a wide angle of visibility can be obtained.

17 Claims, 8 Drawing Sheets

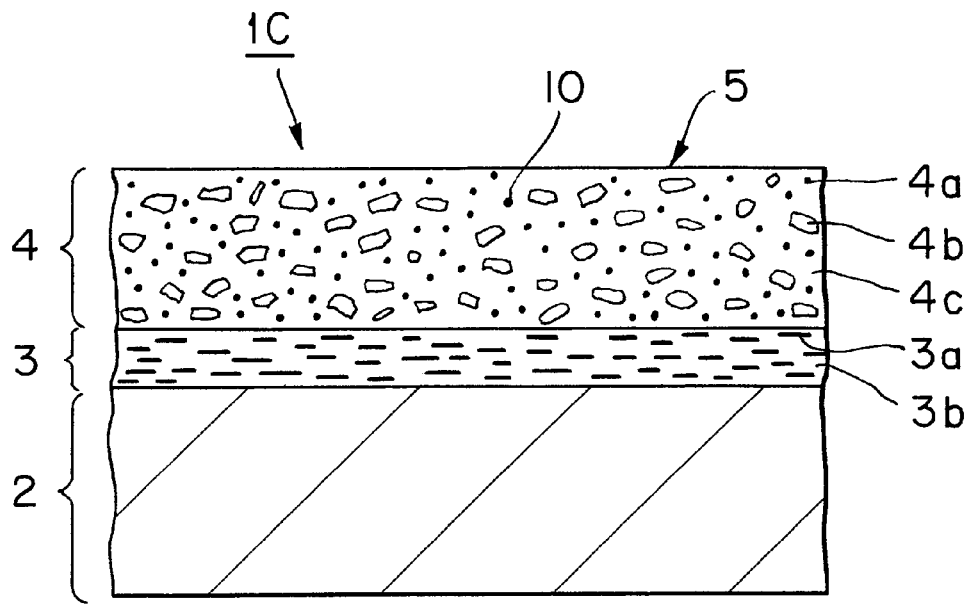
F I G. 7
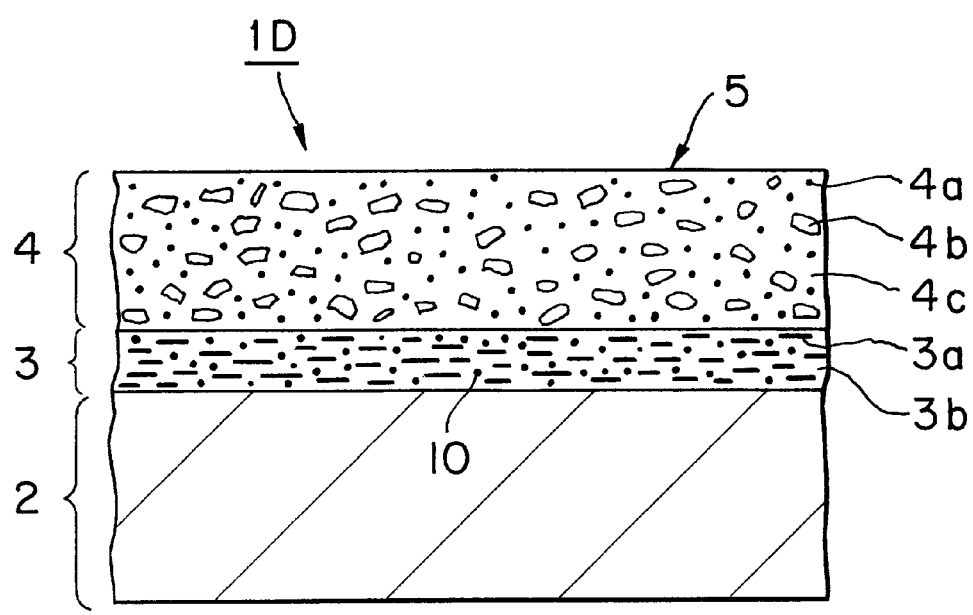
F I G. 8

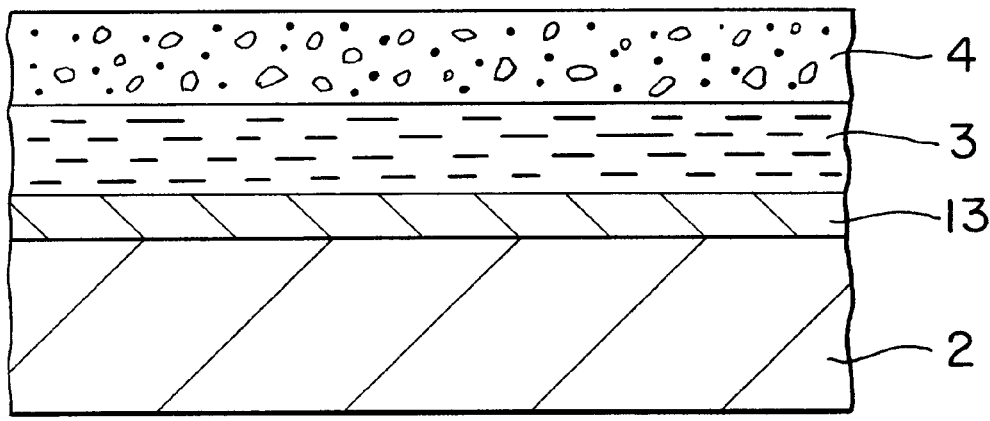
F I G. 14
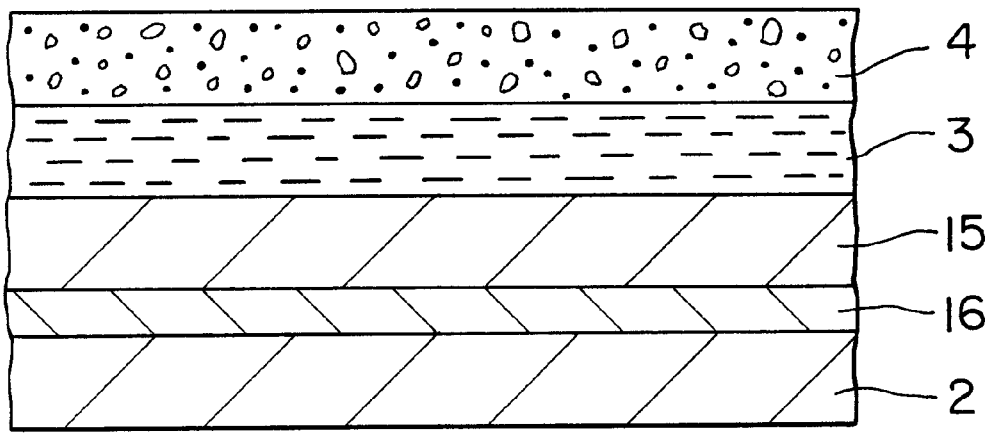
F I G. 15

REFLECTION-TYPE PROJECTION SCREEN

BACKGROUND OF THE INVENTION

The present invention relates to a reflection-type projection screen useful for receiving an image projected by a projector.

With respect to the projection screen useful for receiving an image projected by a projector, the following proposals have conventionally been made.

In Japanese Utility Model Registration No. 30811, it is proposed that a film containing a resin binder and aluminum powder dispersed therein, formed on the surface of a projection screen is utilized as the light-diffusing and light-reflecting surface of the projection screen.

In Japanese Utility Model Laid-Open Publication No. 40835/1989 and Japanese Patent Laid-Open Publication No. 88263/1993, it is proposed that a resin layer in which a so-called pearl pigment made from mica flakes or mica flakes coated with a titanium dioxide film is dispersed is used as the light-diffusing and light-reflecting surface of a projection screen.

In Japanese Patent Laid-Open Publication No. 53945/1992, it is proposed that a light-diffusing layer made of a transparent resin layer in which calcite powder serving as a light-diffusing agent of low light absorption is dispersed is laminated on a light-reflecting layer.

However, these conventional techniques respectively have the following shortcomings.

The projection screen of Japanese Utility Model Registration No. 30811 is disadvantageous in that when the luminance of reflected light is increased, the reflection of light becomes nearly equal to mirror reflection, and the angle of diffusion thus becomes narrow and that when the angle of diffusion is increased, on the contrary, the luminance of reflected light is decreased. Moreover, this projection screen is also insufficient in the contrast between light and darkness, which is one of the properties required for projection screens.

The projection screen proposed in Japanese Utility Model Laid-Open Publication No. 40835/1989 or in Japanese Patent Laid-Open Publication No. 88263/1993 is superior to the above-described projection screen of Japanese Utility Model Registration No. 30811 in any of the luminance of reflected light (gain), the angle of diffusion (half value angle) and image contrast.

In recent years, however, it has been required to further improve the luminance and image contrast without decreasing the angle of diffusion. The projection screens proposed in the above two publications cannot meet this requirement. This demand is very strong particularly in the field of screens for use in household reflection-type television receivers which are used under such conditions that the luminance of projection light is relatively low and that extraneous light (sunlight, lamplight, etc.) cannot be completely shut off.

The projection screen proposed in Japanese Patent Laid-Open Publication No. 53945/1992 has been improved in luminance (gain), but is still insufficient in contrast as compared with the previously-mentioned projection screen described in Japanese Utility Model Laid-Open Publication No. 40835/1989.

Thus, it has been impossible to obtain any of the desired luminance of reflected light, angle of visibility and contrast by the conventional reflection-type projection screens.

SUMMARY OF THE INVENTION

The present invention has been accomplished in order to solve the aforementioned problems in the prior art. The object of the present invention is therefore to provide a reflection-type projection screen which has high reflection luminance (high gain) and sufficiently large angle of visibility and which can provide high image contrast even in the light.

A reflection-type projection screen according to one embodiment of the present invention comprises a light-reflecting layer and a light-diffusing layer, wherein the light-reflecting layer comprises a layer made from a transparent resin in which at least flakes of a light-reflective material are dispersed, and the light-diffusing layer comprises a layer having light-diffusing function, comprising a transparent resin and fine crystalline particles of calcite dispersed therein, and also comprising an achromatic-light-absorbing means.

A reflection-type projection screen according to another embodiment of the present invention comprises a substrate sheet, and first and second coating layers provided thereon, wherein the first coating layer is a coating layer having light-reflecting function, formed by applying a coating composition comprising a transparent resin and flakes of a light-reflective material, and the second coating layer is a coating layer having light-diffusing function, formed by applying a coating composition comprising a transparent resin, fine crystalline particles of calcite and an achromatic pigment and/or dye.

A reflection-type projection screen according to still another embodiment of the present invention comprises a substrate sheet, and first, second and third coating layers provided thereon, wherein the first coating layer is a coating layer having light-reflecting function, formed by applying a coating composition comprising a transparent resin and a light-reflective material, the second coating layer is a coating layer having light-absorbing function, formed by applying a coating composition comprising a transparent resin and an achromatic pigment and/or dye, and the third coating layer is a coating layer having light-diffusing function, formed by applying a coating composition comprising a transparent resin and fine crystalline particles of calcite.

A reflection-type projection screen according to a further embodiment of the present invention comprises a substrate sheet, and first, second and third coating layers provided thereon, wherein the first coating layer is a coating layer having light-reflecting function, formed by applying a coating composition comprising a transparent resin and a light-reflective material, the second coating layer is a coating layer having light-diffusing function, formed by applying a coating composition comprising a transparent resin and fine crystalline particles of calcite, and the third coating layer is a patterned coating layer having light-absorbing function, formed by applying pattern-wise a coating composition comprising a transparent resin and an achromatic pigment and/or dye.

A reflection-type projection screen according to a still further embodiment of the present invention comprises a substrate sheet, and first, second and third coating layers provided thereon, wherein the first coating layer is a coating layer having light-reflecting function, formed by applying a coating composition comprising a transparent resin and a light-reflective material, the second coating layer is a coating layer having light-diffusing function, formed by applying a coating composition comprising a transparent resin and fine crystalline particles of calcite in such a manner that the resulting layer will have a rough surface, and the third coating layer is a patterned coating layer having light-absorbing function, formed on the depressed parts of the second coating layer by applying a coating composition comprising a transparent resin and an achromatic pigment and/or dye onto the second coating layer, and scraping off the coating composition deposited on the protruding parts of the second coating layer.

A reflection-type projection screen according to another embodiment of the present invention comprises a substrate sheet, and first, second and third coating layers provided thereon, wherein the first coating layer is a coating layer having light-reflecting function, formed by applying a coating composition comprising a transparent resin and a light-reflective material, the second coating layer is a coating layer with a rough surface, having light-diffusing function, formed by applying a coating composition comprising a transparent resin and fine crystalline particles of calcite, and roughening the surface of the applied coating composition, and the third coating layer is a patterned coating layer having light-absorbing function, formed on the depressed parts of the second coating layer by applying a coating composition comprising a transparent resin and an achromatic pigment and/or dye onto the second coating layer, and scraping off the coating composition deposited on the protruding parts of the second coating layer.

BRIEF DESCRIPTION OF THE DRAWINGS

FIG. 7 is a diagrammatical sectional partial view of a reflection-type projection screen according to a fourth embodiment of the present invention.

FIG. 8 is a diagrammatical sectional partial view of a reflection-type projection screen according to a fifth embodiment of the present invention.

FIG. 14 is a diagrammatical sectional partial view showing an eleventh embodiment of the present invention.

FIG. 15 is a diagrammatical sectional partial view showing a twelfth embodiment of the present invention.

DETAILED DESCRIPTION OF PREFERRED EMBODIMENTS

Figure 1:
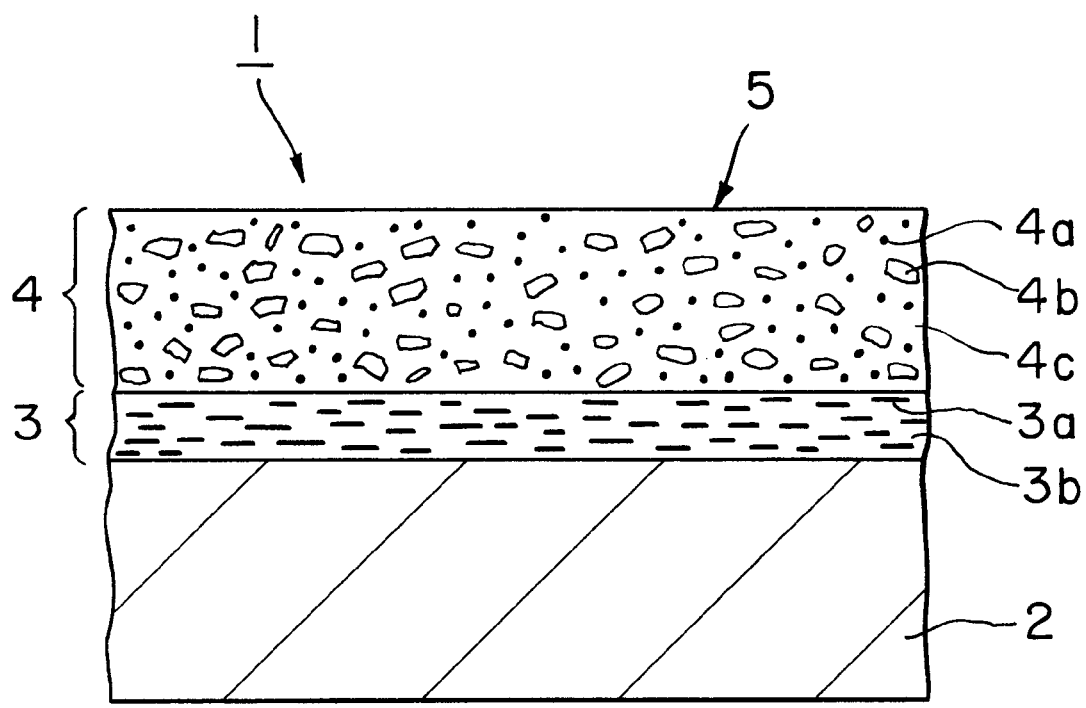
FIG. 1 is a diagrammatical sectional partial view of a reflection-type projection screen according to a first embodiment of the present invention.
Figure 2:
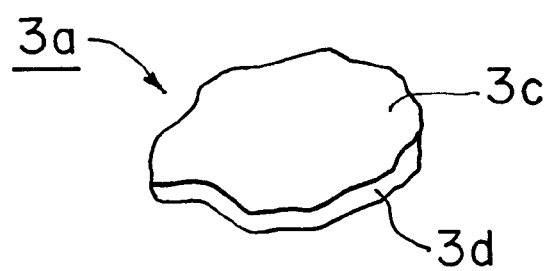
FIG. 2 is a perspective view showing a flake of a light-reflective material contained in the light-reflecting layer of the reflection-type projection screen shown in FIG. 1.

Referring now to FIGS. 1 and 2, an embodiment of the reflection-type projection screen according to the present invention will now be explained in detail.

FIG. 1 is a diagrammatical sectional view showing the structure of a reflection-type projection screen 1 according to the present invention. The reflection-type projection screen 1 is a sheet obtained by laminating a substrate 2, a light-reflecting layer 3 and a light-diffusing layer 4 in the mentioned order.

[Substrate 2]

A material in the form of a sheet or plate is used as the substrate 2. Examples of the material in the form of a sheet which can be used as the substrate 2 include sheets of resins such as polyolefin, polyester, polyvinyl chloride (hard, semi-hard or soft), polyethylene and ABS resins, and woven or nonwoven fabrics made from glass or resin fibers. These materials can be used either singly or as a laminate of two or more materials of different types. A laminate of a biaxially-oriented polyethylene terephthalate sheet and a soft or semi-hard polyvinyl chloride sheet is preferred when fire retardance, balance between strength and flexibility, and prevention of creasing are taken into consideration. For a rollable projection screen, a sheet having a thickness of approximately 50 to 500 micrometers is generally used as the substrate 2 considering strength and flexibility.

Examples of the material in the form of a plate which can be used as the substrate 2 include plates made from the above-described resins, metallic plates and wooden plates. These plates can be used either singly or as a laminate of two or more plates of different types. Further, in the case where the substrate 2 is made from a material which has no hiding properties in itself, such as a resin, it is preferable to incorporate a pigment having hiding properties, such as titanium dioxide or carbon black, into the substrate 2, or to coat a coating material containing a pigment having hiding properties onto the surface of the substrate 2. With respect to the shape of the plate, not only a flat plate but also curved one can be used as the substrate 2. In order to improve the adhesion between the substrate and a light-reflecting layer to be provided thereon, the surface of the substrate can be subjected to any adhesion-promoting treatment such as primer coating or corona discharge treatment.

[Light-Reflecting Layer 3]

In this embodiment, a light-reflecting layer 3 is formed on one surface of the substrate 2.

The light-reflecting layer 3 is a layer made from a transparent resin 3b in which flakes 3a of a light-reflective material are dispersed. The flakes 3a are flat in shape. It is preferable to orient the flakes 3a so that the flat surfaces 3c thereof (FIG. 2) will be almost parallel, as shown in FIG. 1, to the projection-light-receiving, image-observation surface 5, which will be the surface of the projection screen. With respect to this surface 5, an explanation will be given later. By orientating the flakes 3a in such a manner, not only a better reflectance but also a moderate angle of diffusion can be obtained.

The following methods can be mentioned as methods for orientating the flat surfaces 3c of the flakes 3a almost parallel to the projection-light-receiving, image-observation surface 5 as shown in FIG. 2: a method in which a film is formed by such a coating method as the roll or comber coating method characterized in that shear stress acts, while a film is coated, in the direction parallel to the film, and by making the thickness of the coating film equal to or smaller than the diameters of the flakes 3a, thereby orienting the flakes 3a in the above-described direction when the film is coated; and a method in which a sheet containing the flakes 3a dispersed therein is stretched.

A metal such as aluminum, silver, chromium or nickel, mica coated with titanium dioxide, or flakes obtained by cutting a resin sheet whose surface has been deposited with a metal can be used as the light-reflective material. It is most preferable to use a metal in order to increase the reflectance.

It is preferable to use flakes 3a whose mean particle diameter is in the range of 5 to 30 micrometers, more preferably about 10 to 20 micrometers, in order to make the luminance of reflected light high and the angle of diffusion wide at the same time.

The amount of the flakes 3a to be incorporated into the light-reflecting layer 3 is preferably 5 to 40% by weight of the light-reflecting layer 3.

The resin 3b serves as a binder, and is selected from those resins which have transparency. Examples of such a resin include acrylic resin, polyester resin, polycarbonate resin, vinyl chloride-vinyl acetate copolymers and polyurethane resin. These resins can be used either singly or in combination of two or more.

It is preferable that the thickness of the light-reflecting layer 3 be in the range of 1 to 10 micrometers from the viewpoint of the luminance of reflected light and also from the economical point of view. The light-reflecting layer 3 is formed on one surface of the substrate 2 by a coating method such as the roll, gravure-roll or comber coating method, or by adhering a sheet which has been made by means of extrusion or casting.

[Light-Diffusing Layer 4]

In the reflection-type projection screen 1 according to the present invention, a light-diffusing layer 4 is formed on the surface of the light-reflecting layer 3.

The light-diffusing layer 4 is a layer which transmits light, and, at the same time, diffuses the light transmitted. The light-diffusing layer 4 comprises a transparent resin 4c serving as a binder, fine crystalline particles of calcite 4b serving as a light-diffusing agent, and an achromatic dye and/or pigment 4a useful for increasing the image contrast between light and darkness. The fine crystalline particles of calcite 4b are homogeneously dispersed in the transparent resin 4c.

It is preferable that the thickness of the light-diffusing layer 4 be approximately 0.5 to 30 micrometers. The light-diffusing layer 4 is formed on the surface of the light-reflecting layer 3 by one of the following methods: a method in which an ink prepared by dispersing the fine crystalline particles of calcite 4b and the achromatic dye or pigment 4a in the transparent resin 4c by the aid of a solvent is coated onto the surface of the light-reflecting layer 3 by the roll, gravure-roll or comber coating method; and a method in which a sheet obtained by casting or extruding a composition prepared by dispersing the fine crystalline particles of calcite 4b and the achromatic dye or pigment 4a in the transparent resin 4c is adhered to the surface of the light-reflecting layer 3.

Figure 3:
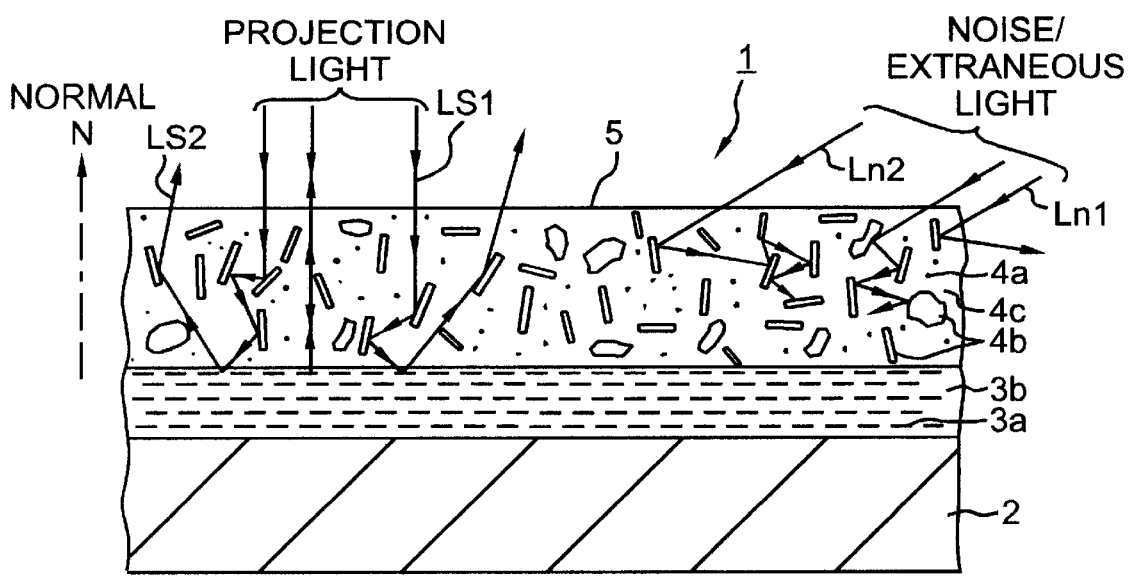
FIG. 3 is a view explaining the action of the reflection-type projection screen shown in FIG. 1.

FIG. 3 is an explanatory view diagrammatically showing the structure of the reflection-type projection screen according to the present invention.

In order to randomly but isotropically orient the fine crystalline particles of calcite 4b as shown in FIG. 3, when a coating ink is coated to form a film by such a coating method as the roll coating method in which shear stress acts in the direction parallel to the surface of the film formed, the thickness of the film is made larger than the particle diameters of the fine crystalline particles of calcite 4b; or a coating ink is coated to form a film by means of spray coating by controlling shear stress which acts in the direction parallel to the film formed. Further, the coating ink is thoroughly agitated before it is used for the coating.

The transparent resin 4c to be used for forming the light-diffusing layer 4 is one of, or a mixture of two or more of transparent resins, such as acrylic resin, polyester resin, polycarbonate resin, vinyl chloride-vinyl acetate copolymers and polyurethane resin.

Calcite is a transparent crystal of hexagonal system, having the chemical composition $CaCO_3$. Calcite which can be used in the present invention may be a single or poly, idiomorphic or allotriomorphic, perfectly- or imperfectly-cleaved crystal, and an idiomorphic single crystal or perfectly-cleaved idiomorphic single crystal is preferably used.

In this embodiment, fine crystalline particles of calcite 4b whose mean particle diameter is from 2 to 20 micrometers when determined by the laser diffraction/scattering method are used. It is preferable that the particle size distribution of the fine crystalline particles of calcite 4b be as narrow as possible when the optical properties are taken into consideration. For instance, when the fine crystalline particles of calcite 4b has a mean particle diameter of 5 micrometers, a desirable particle size distribution is such that 80% by weight or more of all of the particles have diameters ranging from 3 to 7 micrometers. A preferable amount of the fine crystalline particles of calcite 4b to be incorporated into the light-diffusing layer 4 is from 2 to 30% by weight.

The achromatic dye and/or pigment 4a is incorporated into the light-diffusing layer 4 in an amount effective for improving the contrast of a reflection image without impairing the transparency of the light-diffusing layer 4 and the luminance of the reflection image.

A carbon pigment such as carbon black or graphite, or a black pigment or dye such as aniline black or cyanine black can be used as the achromatic dye and/or pigment 4a. Alternatively, it is possible to obtain achromatic color (grey to black) by mixing components of the three primary colors, that is, a blue pigment or dye such as phthalocyanine blue, a red pigment and/or dye such as quinacridone red, and a yellow pigment or dye such as isoindolinone.

Achromatic color is a color which can be defined only by lightness, one of the three attributes of color. In the present invention, the achromatic color is desirably a color whose Y value defined in JIS Z8720 is approximately 0 to 60 when determined by using the standard illuminant C. In the present invention, however, the achromatic color is not required to be achromatic in the strict sense of the word, and can have a hue/saturation which has no effect upon an image projected by projection light.

The preferable amount of the achromatic dye and/or pigment 4a to be incorporated varies depending upon the type thereof. In the case where carbon black is used, the preferable amount thereof is approximately 0.01 to 5% by weight, more preferably about 0.1 to 5% by weight. It is noted that the following embodiment is effective for increasing the image contrast in the light, while maintaining the luminance of reflected light high and the angle of diffusion wide: as shown in FIG. 3, the fine crystalline particles of calcite 4b are oriented and distributed in the light-diffusing layer 4 so that the flat surfaces of at least part of the fine crystalline particles 4b of calcite will not be parallel to the projection-light-receiving, image-observation surface 5

(typically, a case where the flat surfaces of the calcite particles are randomly but isotropically oriented), and, at the same time, the flakes 3a are oriented in the light-reflecting layer 3 so that the flat surfaces 3c of all of the flakes 3a will be almost parallel to the image-observation surface 5 (see FIG. 3).

The surface of the light-diffusing layer 4 is the projection-light-receiving, image-observation surface 5 which receives incident projection light and on which an image to be observed is formed. This surface 5 can be made flat and smooth as shown in FIG. 1; or, when necessary, it can be made rough by means of sandblasting or satinizing, or made into a concave or convex shape like a lenticular or Fresnel lens, thereby adjusting the angle distribution of the luminance of reflected light (light distribution properties).

The reflection-type projection screen 1 according to the present invention comprises the substrate 2, and the light-reflecting layer 3 and the light-diffusing layer 4 which are provided on the substrate 2 in this order, these three constituents being in a state of laminate. For this reason, the following effects can be obtained.

(1) The fine crystalline particles of calcite 4b absorb light slightly, and are moderate in the light-diffusing properties. Therefore, the light-diffusing layer 4 formed by using a transparent resin 4c into which the fine crystalline particles of calcite 4b are dispersed has an increased transmittance. On the other hand, the light-reflecting layer 3 comprising flakes 3a of a light-reflective material dispersed in a resin 3b has a high reflectance. Due to the synergistic effect of these advantageous properties, the reflection-type projection screen 1 according to the present invention has an extremely high reflection luminance (high gain).

(2) Due to the effect of the two-step diffusion of incident light, that is, the diffusion caused by the fine crystalline particles of calcite 4b contained in the light-diffusing layer 4, and the diffusion caused by the flakes 3a of a light-reflective material contained in the light-reflecting layer 3, the projection screen has a sufficiently wide angle of visibility.

In the case where the fine crystalline particles of calcite 4b are oriented and distributed in the light-diffusing layer 4 so that the flat surfaces of at least part of the fine crystalline particles of calcite 4b will not be parallel to the projection-light-receiving, image-observation surface 5, and, at the same time, the flakes 3a are oriented in the light-reflecting layer 3 so that the flat surfaces of all of the flakes will be almost parallel to the projection-light-receiving, image-observation surface 5, most of incident projection light which forms a narrow angle with the normal N of the projection-light-receiving, image-observation surface 5 is transmitted between the fine crystalline particles of calcite 4b (in particular, between those crystalline particles whose flat surfaces are oriented to be perpendicular or almost perpendicular to the image-observation surface) while being moderately diffused between the flat surfaces of the crystalline particles with undergoing almost no attenuation, and reflected at the light-reflecting layer 3 at a high reflectance. The projection light thus reflected at the light-reflecting layer 3 comes out from the projection-light-receiving, image-observation surface 5 while being moderately re-diffused in the light-diffusing layer 4. An image is thus formed on the surface 5.

On the other hand, noise light (extraneous light) which forms a large angle with the normal N of the projection-light-receiving, image-observation surface 5 (light $Ln_1$, $Ln_2$ in FIG. 3) is reflected in the direction almost parallel to the surface 5. For this reason, the light is attenuated, like the light $Ln_2$, due to multiple reflection caused by the fine crystalline particles of calcite 4b, or deviates, like the light Ln1, from the visual field (to the right or left in FIG. 3). A projected image having higher contrast can thus be obtained even in the light.

(3) In general, the incorporation of the fine crystalline particles of calcite 4b into the light-diffusing layer 4 brings about decrease in the contrast of a reflection image, and is thus disadvantageous for the projection screen. However, in the reflection-type projection screen 1 according to the present invention, an achromatic pigment and/or dye 4a is incorporated into the light-diffusing layer 4, so that noise light whose traveling light path is long due to multiple reflection is greatly attenuated. On the other hand, projection light whose light path is short is scarcely attenuated (the amount of light attenuated is in exponential proportion to the length of light path). The SN ratio of projection (signal) light to noise light is thus improved. As a result, the contrast of a reflection image in a light room can be improved to a level which is required for images formed on projection screens.

Example 1 of the reflection-type projection screen according to the present invention will now be explained by referring to FIGS. 1 and 2.

EXAMPLE 1

A composite sheet prepared by dry-laminating a biaxially-oriented polyethylene terephthalate film having a thickness of 125 micrometers on the surface of a polyvinyl chloride sheet having a thickness of 300 micrometers, containing as a plasticizer 48 parts by weight of dioctyl adipate was used as the substrate 2. A light-reflecting layer 3 was formed on the surface of this substrate 2. This light-reflecting layer 3 was a transparent layer made from polyurethane resin 3b containing 20% by weight of flakes 3a (mean particle diameter: 10 micrometers) of aluminum, a light-reflective material.

The light-reflecting layer 3 was formed in the following manner: an ink was prepared by dispersing the flakes 3a and the polyurethane resin 3b in a solvent mixture consisting of toluene/MEK (methyl ethyl ketone)/IPA (isopropyl alcohol) so that the ink would have a solid content of 30 to 40%; and this ink was coated onto the substrate 2 to form a film in such a manner that the flat surfaces 3c of the flakes 3a would be almost parallel to the projection-light-receiving, image-observation surface 5 and that the thickness of the film after dried would be 5 micrometers, the coating being repeated twice so as to obtain a coating film having a total thickness of 10 micrometers. The flakes 3a were oriented in the light-reflecting layer 3 so that the flat surfaces 3c (surfaces having largest surface areas) of the flakes would be almost parallel to the coating film, as shown in FIG. 3.

Next, a light-diffusing layer 4 was formed on the surface of the above-formed light-reflecting layer 3. This light-diffusing layer 4 was a transparent layer made from polyurethane resin 3b containing 0.7% by weight of carbon black, an achromatic pigment 4a, and 20% by weight of fine crystalline particles of calcite 4b having a mean particle diameter of 4 micrometers, 70% of all of the particles having diameters ranging from 3 to 7 micrometers.

The above light-diffusing layer 4 was formed in the following manner: an ink was prepared by adding toluene/MEK (methyl ethyl ketone)/IPA (isopropyl alcohol) to the above-described solid components so that the ink would have a solid content of 30 to 40%; and this ink was coated onto the surface of the light-reflecting layer 3 by the gravure-roll coating method to form a layer having a thickness of 10 micrometers (when dried). The fine crystalline particles of calcite 4b were oriented in the light-diffusing layer 4 almost randomly as shown in FIG. 3.

Thus, a reflection-type projection screen 1 of this example was prepared.

trast is obtained from the equation: (contrast)=(luminance on the screen surface receiving black signal)/(luminance on the screen surface receiving white signal), by converting the numerator into 1.

The results are shown in Table 1.

TABLE 1

| | Conditions of preparation | | | | | | Results | | |
|---|---|---|---|---|---|---|---|---|---|
| | Light-reflecting layer 3 | | | Light-diffusing layer 4 | | | | Angle of visibility (°) | |
| Sample | Substrate rate Shape | Flakes 3a | Type of resin 3b | Calcite 4b | Type of dye 4a | Type of resin 4c | Screen gain | | Contrast |
| Example 1 | Sheet | Aluminum, particle diameter 10 μm, 20 wt % | Urethane | Particle diameter, 4 μm, 20 wt % | Carbon black 0.7 wt % | Poly-urethane | 2.02 | 30.8 | 1/23.4 |
| | ↑ | Titanium dioxide, 20 wt % | ↑ | ↑ | none* | Poly-urethane | 1.53 | 31.5 | 1/14.3 |

(Note)
*means beyond the scope of the present invention.

On the other hand, the reflection-type projection screen proposed in Japanese Patent Laid-Open Publication No. 53945/1992, one of the previously-mentioned conventional techniques, was prepared as a conventional example. Namely, the procedure of the above example was repeated except that the flakes 3a of aluminum incorporated into the light-reflecting layer 3 were replaced by titanium dioxide (titanium white) powder and that the achromatic pigment 4a was not incorporated into the light-diffusing layer 4, thereby obtaining the desired reflection-type projection screen.

With respect to these two projection screens, the screen gain (reflection luminance), the angle of visibility, and the contrast of a reflection image were respectively measured under the following test conditions.
(Screen Gain)

Onto the projection surface of the reflection-type projection screen, a white-colored solid image is projected by a projector. The luminance (cd/m²) and the illuminance (1×) at the center of the projection surface are measured, and the screen gain is calculated from the equation: (screen gain)= $\pi \times$(luminance/illuminance). It is noted that the distance between the projector and the screen was adjusted to 2 m and that the angles of projection light diffusing up- and downward, and right- and leftward in terms of the horizontal direction were adjusted to 30° each.
(Angle of Visibility)

A white-colored solid image is projected onto the screen under the same conditions as in the measurement of the screen gain. The dependence of luminance on angle (light distribution properties) is determined by horizontally scanning a luminance meter within the range of angle of −60° to +60° in terms of the normal drawn from the center of the screen. The angle of visibility is evaluated by the range of angle which covers ½ or more of the luminance along the normal, that is, the half value angle.
(Contrast of Reflection Image)

Two different images, that is, a black-colored solid image and a white-colored solid image, are projected onto the screen by a projector under the same conditions as in the above-described measurement of the screen gain. The con- The data shown in Table 1 demonstrate that the reflection-type projection screen of Example 1 has a high reflection luminance and a wide angle of visibility, and, at the same time, can form thereon an image having high contrast between light and darkness. It can thus be known that this screen has very desirable properties as a reflection-type projection screen.

Further, when the reflection-type projection screen of Example 1 is used, it is not necessary to use any other special device or element such as a polarized light filter or a polarization-type projector. The projection system can thus be simplified.

On the contrary, both of the reflection luminance and the angle of visibility of the conventional screen are inferior to those of the screen of Example 1. It is thus understood that the conventional screen has poor properties as a reflection-type projection screen.

Although the embodiment of the present invention shown in FIGS. 1 to 3 has the aforementioned advantageous effects, it has been found to still have following problems.

(1) The surface of the screen is easily scratched during the handling, etc. of the screen.

(2) The release properties of the light-diffusing layer 4, which can be evaluated by the use of cellophane tape, tend to become worse after the screen has been used for a long period of time (in general, the adhesion between a substrate and a coating film provided thereon can be evaluated by adhering cellophane tape to the coating film, and observing whether or not the coating film is peeled off together with the cellophane tape when the cellophane tape is peeled off; it is required that only the cellophane tape is released and that the coating film does not come off along with the cellophane tape).

(3) In the case where the screen which has been rolled up is stored for a long period of time, the substrate 2 and the light-diffusing layer 4, which are in close contact with each other in the roll, tend to adhere to each other (this phenomenon is referred to as "blocking"). Therefore, there is such a possibility that the screen cannot be unrolled and thus cannot be used any more.

(4) The surface of the screen is easily stained.

The above problems (1) to (4) can be solved by carefully selecting the materials to be used for making the substrate 2, the light-reflecting layer 3 and the light-diffusing layer 4. However, the following problems may further arise depending upon the materials selected.

(5) There is a possibility that the optical properties (reflection luminance, contrast, etc.) essentially required for screens are impaired.

(6) The problems (1) to (4) can also be solved by further coating a lubricant onto the surface of the light-diffusing layer 4. In this case, however, the surface of the screen shows high water repellency, so that it is difficult to form a frame-printed layer on the surface of the light-diffusing layer 4.

The above-described problems (1) to (6) of the reflection-type projection screen shown in FIG. 1 can be solved by incorporating an additive having lubricating properties into the light-diffusing layer 4 in the aforementioned embodiment, thereby roughening the surface of the light-diffusing layer 4 and, at the same time, providing thereon a layer having lubricating properties. An embodiment which can solve the above-described problems will now be explained.

Figure 4:
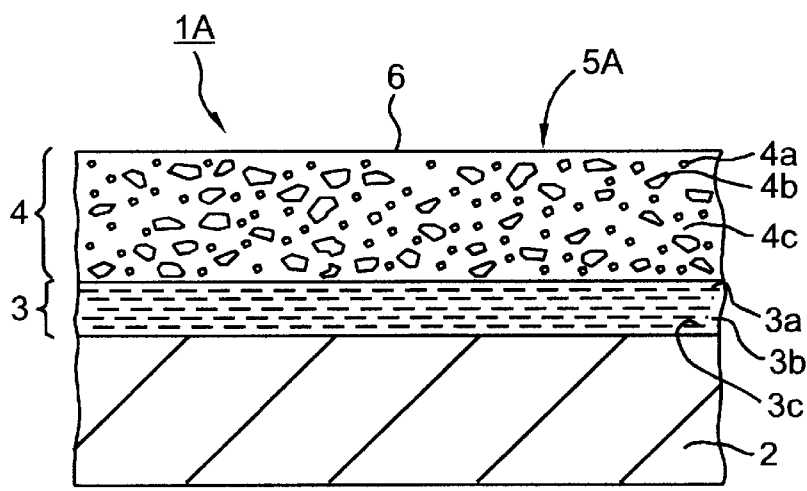
FIG. 4 is a diagrammatical sectional partial view of a reflection-type projection screen according to a second embodiment of the present invention.

According to this embodiment, a lubricant 6 is incorporated into a light-diffusing layer 4 in a screen 1 as shown in FIG. 4. The lubricant 6 is not limited to specific additives, and any material which can show lubricating properties by lowering the surface energy or by decreasing the contact area on the surface and which is compatible with the other components (an achromatic dye or pigment 4a, fine crystalline particles of calcite 4b) contained in the light-diffusing layer 4 can be used as the lubricant 6.

However, in the case where a lubricant which cannot show lubricating properties unless it is added in a large amount is used, the above-described compatibility is adversely affected, the adhesion between the light-diffusing layer 4 and the lubricant is decreased, and the production cost is increased. It is therefore desirable to use a lubricant which can reveal lubricating properties even when it is added in an extremely small amount, which does not provide unintended roughness on the surface of the light-diffusing layer 4 and which does not impair the properties of the reflection-type screen by altering the reflecting/diffusing properties of the light-diffusing layer 4.

From the above-described viewpoints, an organosilicic compound such as silicone oil, modified silicone oil, or silicone acrylate monomer or prepolymer is preferable as the lubricant for use in the present invention.

By using any of the above additives, even if the amount thereof added being extremely small, it is possible to solve the previously-mentioned problems (1) to (6) without impairing the properties of the reflection-type projection screen. This is because the above additives are highly compatible with the components of the light-diffusing layer 4 and because the additive are not unevenly distributed on and adhered to the surface of the light-diffusing layer 4, so that they do not roughen the surface of the light-diffusing layer unlike lubricating beads, or do not alter the refractive index of the light-diffusing layer 4 unlike fluoropolymers.

In the case where an organosilicic compound is used as the lubricant, although the amount thereof to be used depends upon the type of the silicone compound, it is desirable to use 0.05 to 3.0 parts by weight of the silicone compound per 100 parts by weight of the transparent resin in order to securely obtain the aforementioned effects.

Further, the amount of the lubricant to be used is decided according to the wet index of the surface of the light-diffusing layer 4. It is desirable that the wet index of the surface of the light-diffusing layer 4 be in the range of 31 to 39.

When the amount of the lubricant added is small and the wet index is in excess of 39, the predetermined lubricating properties cannot be obtained. On the contrary, when the amount of the lubricant added is large and the wet index is less than 31, the adhesion between the light-diffusing layer and a layer on which a frame, a logo or the like has been printed (in general, by means of screen process printing) as needed is decreased. In this case, it may be considered that the adhesion can be improved by incorporating the same additive as the above into an ink to be used for printing the frame. However, this solution is not practical because it has such problems that the printability upon silk process printing is impaired and that cissing is caused when a conventional ink for silk process printing is used after the lubricant-containing ink is used.

Examples of other materials which can be used as the lubricant include waxes such as insect wax, montan wax and paraffin wax, powders of fluororesins such as polyethylene tetrafluoride and polyvinylidene fluoride, and powders of polyolefin resins such as polyethylene and polypropylene.

In the embodiment shown in FIG. 4, the lubricant 6 is incorporated into the light-diffusing layer 4. It is therefore possible to decrease or eliminate the scratching or staining of the surface of the screen, which tends to be caused during the production or use of the screen, without impairing the previously-mentioned effects of the embodiment shown in FIG. 1.

Further, in this embodiment, the light-diffusing layer 4 contains the lubricant 6, so that even after the screen has been subjected to durability test (test for resistance to heat, to moisture and heat, to cold and to light), the surface of the light-diffusing layer 4 shows improved adhesion-protecting properties, that is, release properties which can be evaluated by the use of cellophane tape or the like. This is because even if the adhesion between (or in each of) the light-diffusing layer 4 and the light-reflecting layer 3 is decreased by the durability test, the transmission of force with which the cellophane tape peels off the light-diffusing layer 4 and the light-reflecting layer 3 is prevented due to the effect of the lubricant 6 which makes the release of the cellophane tape easy.

Furthermore, since the light-diffusing layer 4 contains the lubricant 6, the screen is free from the blocking phenomenon during the storage thereof.

In addition, the lubricant 6 is moderately diluted with and dispersed in the light-diffusing layer 4, so that the light-diffusing layer 4 does not repel water. It is therefore possible to print a frame on the surface of the light-diffusing layer 4 without causing a failure due to the cissing of an ink.

With respect to the embodiment shown in FIG. 4, Example 2 will now be explained by referring to FIGS. 4 and 2.

EXAMPLE 2

A composite sheet prepared by dry-laminating a white-colored biaxially-oriented polyethylene terephthalate film having a thickness of 125 micrometers, containing as a white pigment 5 parts by weight of titanium white on the surface of a black-colored polyvinyl chloride sheet having a thickness of 300 micrometers, containing as a plasticizer 48 parts by weight of dioctyl adipate, and as a black pigment 5 parts by weight of carbon black was used as the substrate 2. A light-reflecting layer 3 was formed on the surface of this substrate 2. This light-reflecting layer 3 is a transparent layer made from polyurethane resin 3b containing 20% by weight of flakes 3a (mean particle diameter: 10 micrometers) of aluminum, a light-reflective material.

The light-reflecting layer 3 was formed in the following manner: an ink was prepared by dispersing the above-described components of the light-reflecting layer 3 in a solvent mixture consisting of toluene/MEK (methyl ethyl ketone)/IPA (isopropyl alcohol) so that the ink would have a solid content of 30 to 40%; and this ink was coated onto the substrate 2 to form a film in such a manner that the flat surfaces 3c of the flakes 3a would be almost parallel to the projection-light-receiving, image-observation surface 5 and that the thickness of the film after dried would be 5 micrometers, the coating being repeated twice so as to obtain a coating film having a total thickness of 10 micrometers. The flakes 3a were oriented in the light-reflecting layer 3 so that the flat surfaces 3c (surfaces having largest surface areas) of the flakes 3a would be almost parallel to the film formed, as shown in FIG. 3.

Next, a light-diffusing layer 4 was formed on the surface of the above-formed light-reflecting layer 3. This light-diffusing layer 4 was a transparent layer made from polyurethane resin 3b containing 0.7% by weight of carbon black, an achromatic pigment 4a, and 20% by weight of fine crystalline particles of calcite 4b having a mean particle diameter of 4 micrometers, 70% of all of the particles having diameters ranging from 3 to 7 micrometers.

Further, in this embodiment, amino-modified silicone oil was incorporated as the lubricant 6 into the light-diffusing layer 4 in an amount of 0.3 parts by weight per 100 parts by weight of the polyurethane resin. The wet index of the light-diffusing layer 4 was found to be 35. 8.3 parts by weight of microsilica was also added to the light-diffusing layer 4.

The above light-diffusing layer 4 was formed in the following manner: an ink was prepared by adding toluene/MEK (methyl ethyl ketone)/IPA (isopropyl alcohol) to the above-described solid components so that the ink would have a solid content of 30 to 40%; and this ink was coated onto the surface of the light-reflecting layer 3 by the gravure-roll coating method to form a layer having a thickness of 10 micrometers (when dried). The fine crystalline particles of calcite 4b were oriented in the light-diffusing layer 4 almost randomly, as shown in FIG. 3.

Thus, a reflection-type projection screen 1 of this example was prepared.

On the other hand, the reflection-type projection screen proposed in Japanese Patent Laid-Open Publication No. 53945/1992, one of the previously-mentioned conventional techniques, was prepared as a conventional example. Namely, the procedure of Example 2 was repeated except that the flakes 3a of aluminum incorporated into the light-reflecting layer 3 were replaced by titanium dioxide (titanium white) powder and that the achromatic pigment 4a was not incorporated into the light-diffusing layer 4, thereby obtaining the desired reflection-type projection screen.

It is noted that the wet index of the light-diffusing layer into which the lubricant 6 had not been incorporated (Comparative Example 1) was found to be 41. In Comparative Example 2, 5 parts by weight of the lubricant 6 was incorporated into the light-diffusing layer. The wet index of this light-diffusing layer was found to be below 29.

With respect to these projection screens, the screen gain (reflection luminance), the angle of visibility, and the contrast of a reflection image were respectively measured under the following test conditions.

(Screen Gain)

Onto the projection surface of the reflection-type projection screen, a white-colored solid image is projected by a projector. The luminance ($cd/m^2$) and the illuminance (1x) at the center of the projection surface are measured, and the screen gain is calculated from the equation: (screen gain)= $\pi \times$(luminance/illuminance). It is noted that the distance between the projector and the screen was adjusted to 2 m and that the angles of projection light diffusing up- and downward, and right- and leftward in terms of the horizontal direction were adjusted to 30° each.

(Angle of Visibility)

A white-colored solid image is projected onto the screen under the same conditions as in the measurement of the screen gain. The dependence of luminance on angle (light distribution properties) is determined by horizontally scanning a luminance meter within the range of angle of −60° to +60° in terms of the normal drawn from the center of the screen. The angle of visibility is evaluated by the range of angle which covers ½ or more of the luminance along the normal, that is, the half value angle.

(Contrast of Reflection Image)

Two different images, that is, a black-colored solid image and a white-colored solid image, are projected onto the screen by a projector under the same conditions as in the above-described measurement of the screen gain. The contrast is obtained from the equation: (contrast)=(luminance on the screen surface receiving black signal)/(luminance on the screen surface receiving white signal), by converting the numerator into 1.

The results are shown in Table 2.

TABLE 2

| | Conditions of preparation | | | | | | Results | | |
| --- | --- | --- | --- | --- | --- | --- | --- | --- | --- |
| | | Light-reflecting layer 3 | | Light-diffusing layer 4 | | | | | |
| Sample | Substrate rate Shape | Flakes 3a | Type of resin 3b | Calcite 4b | Type of dye 4a | Type of resin 4c | Screen gain | Angle of visibility (°) | Contrast |
| Example 2 | Sheet | Aluminum, particle diameter 10 μm, 20 wt % | Urethane | Particle diameter, 4 μm, 20 wt % | Carbon black 0.7 wt % | Polyurethane | 2.02 | 30.8 | 1/23.4 |
| Conven- | ↑ | Titanium | ↑ | ↑ | none* | Poly- | 1.53 | 31.5 | 1/14.3 |

TABLE 2-continued

| | | Conditions of preparation | | | | | | Results | | |
| | | Light-reflecting layer 3 | | Light-diffusing layer 4 | | | | | Angle | |
| Sample | Substrate rate Shape | Flakes 3a | Type of resin 3b | Calcite 4b | Type of dye 4a | Type of resin 4c | Screen gain | of visi- bility (°) | Contrast |
| tional Example | | dioxide, 20 wt %* | | | | urethane | | | |

(Note)
*means beyond the scope of the present invention.

The data shown in Table 2 demonstrate that the reflection-type projection screen of Example 2 has a high reflection luminance and a wide angle of visibility, and, at the same time, can form thereon an image having high contrast between light and darkness. It can thus been known that this screen has very desirable properties as a reflection-type projection screen.

Further, when the reflection-type projection screen 1 of Example 2 is used, it is not necessary to use any other special device or element such as a polarized light filter or a polarization-type projector. The projection system can thus be simplified.

On the contrary, both of the reflection luminance and the angle of visibility of the conventional screen are inferior to those of the screen of Example 2. It is thus understood that the conventional screen has poor properties as a reflection-type projection screen.

A black frame pattern was printed on the outer periphery of the surface of each of the reflection-type projection screens of Example 2, and of Comparative Examples 1 and 2 by means of silk screen printing by the use of a black ink containing a two-pack-type hardening polyurethane resin as a binder.

With respect of these reflection-type projection screens, the previously mentioned screen gain, angle of visibility and contrast of a reflection image were measured. As a result, good values were obtained in terms of all of these properties. The screens were thus found to have excellent properties.

Further, these reflection-type projection screens were subjected to tests which were carried out under the following conditions in order to evaluate the anti-blocking properties and to measure the adhesion of the ink used for printing the frame. It is noted that "FOM" means irradiation conducted by a fadeometer of sunshine carbon arc lamp type (a tester for light resistance).

(Anti-Blocking Properties)

100 square cuts are made on the surface of the coating film with 11 horizontal and 11 vertical lines (pitch 1 mm), each horizontal and vertical lines being at right angles to each other. Cellophane tape ("Nichiban No. 405 Cellophane Tape") is adhered to the coating film having the square cuts, and then peeled off. The number N ($0 \leq N \leq 100$) of the square-cut portions of the coating film which have not been removed together with the cellophane tape when the cellophane tape is peeled off is counted. This procedure is repeated 10 times. The number N obtained in each run is indicated by N/100. It is judged that when the number N is closer to 100, the light-diffusing layer 4 has better anti-blocking properties.

(Adhesion of Ink Used for Printing Frame)

The above-described test method is applied to the ink film. It is judged that when the number N is closer to 100, the adhesion between the ink and the light-diffusing layer 4 is more excellent.

The results are shown in Table 3.

TABLE 3

| | Anti-blocking properties | | | Adhesion of ink used for printing frame | |
| | After heat resistance | After moisture-heat resistance | After light resistance | | |
| Sample | test (70° C. × 7 days) | test (60° C., 95% × 7 days) | test (F.O.M, 50 hrs.) | Initial | 60° C. × 8 hrs. Load 2 kgf |
| Example 2 0.3 parts by weight | 100/100 | 100/100 | 100/100 | 100/100 | 100/100 |
| Comparative Example 1 Not added* | 50/100 or less after 3 runs | — | 50/100 or less after the first run | 100/100 | 50/100 or less after the first run |
| Comparative Example 2 5 parts by weight | 100/100 | 100/100 | 100/100 | 0/100 | — |

(Note)
*means beyond the scope of the present invention.

The data shown in Table 3 demonstrate that the reflection-type projection screen of Example 2 is excellent in the anti-blocking properties evaluated by using the cellophane tape, and also in the adhesion to the ink used for printing the frame. The adhesion of the ink is high even after the durability test has been carried out, and the reason for this is considered that the lubricant migrates to the surface of the ink to make the release of the cellophane tape easy.

On the contrary, the lubricant 6 was not used for the screen of Comparative Example 1. Therefore, the screen shows impaired anti-blocking properties, and decreased adhesion to the ink used for printing the frame.

In the case of the screen of Comparative Example 2, the amount of the lubricant 6 used is in excess of the optimum range. Therefore, although the screen shows excellent anti-blocking properties, the adhesion between the ink used for printing the frame and the light-diffusing layer 4 is decreased.

As mentioned previously, an achromatic pigment or dye 4a is incorporated into the light-diffusing layer 4 of the reflection-type projection screen shown in FIG. 1. The contrast of a reflection image is therefore improved to such an extent that the screen will have no practical troubles as a reflection-type projection screen.

Namely, in the light-diffusing layer 4, rays of light are absorbed by the achromatic dye and/or pigment 4a. However, projection light forms a narrow angle with the normal of the surface of the light-diffusing layer 4, and the length of the light path of the projection light traveling in the light-diffusing layer 4 is short. Therefore, the projection light is scarcely absorbed. On the other hand, extraneous noise light forms a wide angle with the normal, and the length of the light path of the noise light traveling in the light-diffusing layer 4 is long because the noise light undergoes multiple reflection. Since the amount of light absorbed by a medium is in exponential proportion to the length of light path, the absorption of the noise light is remarkably increased. For this reason, the SN ratio of projection light (signal light) to extraneous light (noise light) becomes high, and a projection image having high contrast even in the light can thus be obtained.

We made earnest studies in order to further improve the performance of the reflection-type projection screen 1 shown in FIG. 1. As a result, it was found that the following problems were still existing.

Namely, when an achromatic dye and/or pigment 4a is incorporated into the light-diffusing layer 4 itself, the contrast of an image is undoubtedly improved. It is however inevitable that the achromatic dye and/or pigment 4a absorbs also projection light. It is therefore impossible to improve the contrast without limitation. Moreover, there has also been a limit for improving the luminance while maintaining the contrast.

We found that it is possible to further improve the reflection-type projection screen shown in FIG. 1 on the contrast and the luminance without decreasing the gain and the angle of visibility by an embodiment in which an achromatic layer (light-absorbing layer) is provided under the light-diffusing layer 4, instead of imparting light-absorbing properties to the light-diffusing layer 4.

This embodiment will now be explained.

Figure 5:
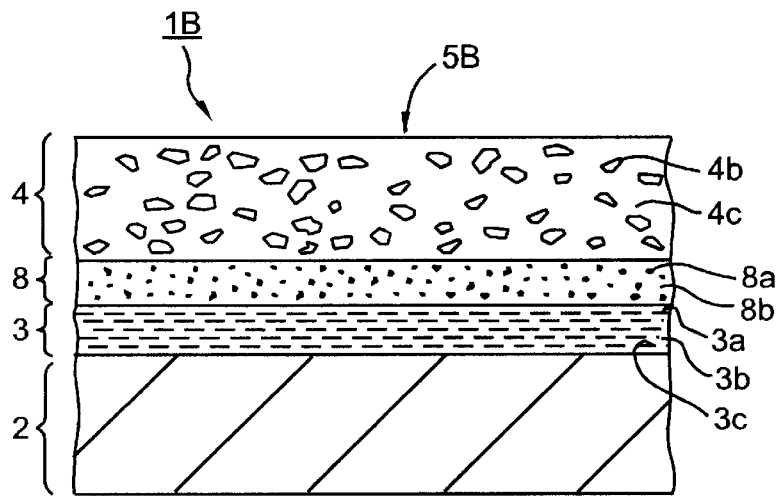
FIG. 5 is a diagrammatical sectional partial view of a reflection-type projection screen according to a third embodiment of the present invention.

A reflection-type projection screen 1B shown in FIG. 5 of this embodiment is a sheet obtained by laminating a substrate 2, a light-reflecting layer 3, a light-absorbing layer 8 and a light-diffusing layer 4 in the mentioned order.

[Substrate 2]

The substrate 2 is basically the same as the substrate of the screen shown in FIG. 1. It is however preferable to use as the substrate 2 a laminate of a glass woven or nonwoven fabric and a soft or semi-hard polyvinyl chloride sheet when fire retardance, balance between strength and flexibility, and prevention of creasing are taken into consideration. Further, in order to improve the smoothness of the surface of the substrate so as to make the properties of the light-reflecting layer 3 and of the light-diffusing layer 4 more stable, it is preferable to use a laminate of a biaxially-oriented polyethylene terephthalate sheet and a soft or semi-hard polyvinyl chloride sheet.

[Light-Reflecting Layer 3]

The light-reflecting layer 3 in this embodiment is basically the same as the one shown in FIG. 1, and formed by using a transparent resin 3b in which flakes 3a are dispersed. The surface of the light-reflecting layer 3 can be made flat and smooth as shown in FIG. 5; or, when necessary (in particular, in order to increase the angle of diffusion), it can also be made rough by means of sandblasting or satinizing, or made into a concave or convex shape like a lenticular or Fresnel lens.

[Light-Absorbing Layer 8]

In the reflection-type projection screen 1B of this embodiment, a light-absorbing layer 8 is formed on the surface of the light-reflecting layer 3. The light-absorbing layer 8 is a layer which absorbs, while transmitting light, a part of the light transmitted. The light-absorbing layer 8 comprises a transparent resin 8b serving as a binder, and an achromatic dye and/or pigment 8a useful for improving the light-absorbing properties and the image contrast between light and darkness. Further, it is also possible to improve the contrast and to impart diffusion properties by dispersing fine crystalline particles of calcite in this light-absorbing layer 8.

The achromatic dye and/or pigment 8a is incorporated into the light-absorbing layer 8 in an amount effective for improving the contrast of a reflection image without impairing the transparency of the light-absorbing layer 8 or the luminance of the reflection image. A carbon pigment such as carbon black or graphite, or a black pigment or dye such as aniline black or cyanine black can be used as the achromatic dye and/or pigment 8a. Alternatively, it is possible to obtain achromatic color (grey to black) by mixing components of the three primary colors, that is, a blue pigment or dye such as phthalocyanine blue, a red pigment or dye such as quinacridone red, and a yellow pigment or dye such as isoindolinone.

Achromatic color is a color which can be defined only by lightness, one of the three attributes of color. In the present invention, the achromatic color is desirably a color whose Y value defined by JIS Z8720 is approximately 0 to 60 when determined by using the standard illuminant C. In the present invention, however, the achromatic color is not required to be achromatic in the strict sense of the word, and can have a hue/saturation which has no effect upon an image projected by projection light.

It is noted that a light-absorbing layer 8 into which a large amount of the achromatic dye or pigment 8a is incorporated absorbs even projection light which should be reflected at the light-reflecting layer 3. Such a light-absorbing layer 8 is therefore unfavorable. The amount of the achromatic dye or pigment 8a to be incorporated varies depending upon the type thereof. In the case where carbon black is used, the amount thereof to be incorporated is approximately 0.01 to 5% by weight, more preferably about 0.1 to 5% by weight. In this case, the thickness of the light-absorbing layer 8 is from 1 to 20 micrometers.

[Light-Diffusing Layer 4]

The light-diffusing layer 4 is a layer which transmits light, and, at the same time, diffuses the light transmitted. Into the light-diffusing layer 4, it is possible to incorporate particles or flakes of various light-diffusing agents such as silica particles, mica flakes, mica flakes coated with titanium dioxide, acrylic resin beads or polycarbonate resin beads. It is however preferable to use a light-diffusing layer formed by utilizing calcite particles as described in Japanese Patent Laid-Open Publication No. 53945/1992 because such a light-diffusing layer has a suitably-high gain and a proper angle of diffusion. In order to make the reflection efficiency high, it is preferable to provide a light-diffusing layer having high light transmittance or excellent light-diffusing properties.

The light-diffusing layer 4 of this embodiment comprises a transparent resin 4c serving as a binder, and fine crystalline particles of calcite 4b serving as a light-diffusing agent. The fine crystalline particles of calcite 4b are homogeneously dispersed in the transparent resin 4c.

The thickness of the light-diffusing layer 4 is preferably about 0.5 to 30 micrometers. The light-diffusing layer 4 is formed on the surface of the light-absorbing layer 8 by one of the following methods: a method in which an ink prepared by dispersing a composition consisting of the transparent resin 4c and the fine crystalline particles of calcite 4b in a solvent is coated onto the surface of the light-absorbing layer 8 by the roll, gravure-roll or comber coating method; and a method in which a sheet obtained by casting or extruding a composition prepared by dispersing the fine crystalline particles of calcite 4b in the transparent resin 4c is adhered to the surface of the light-absorbing layer 8.

Figure 6:
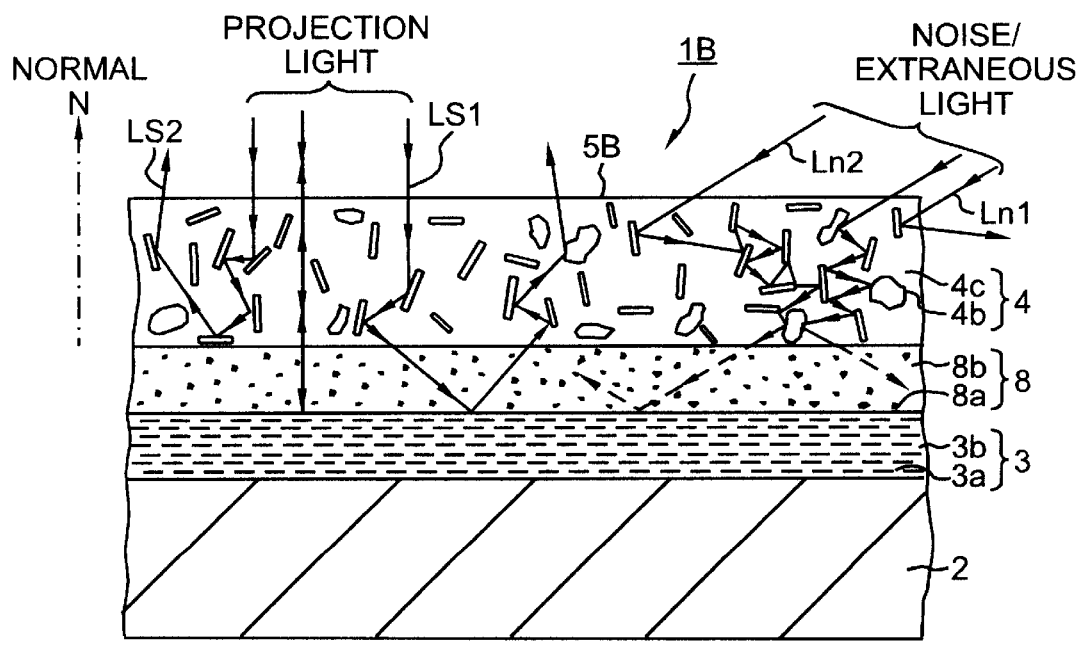
FIG. 6 is a view explaining the action of the reflection-type projection screen shown in FIG. 5.

FIG. 6 is an explanatory view diagrammatically showing the structure of the reflection-type projection screen 1B according to this embodiment. In order to randomly and isotropically orient the fine crystalline particles of calcite 4b as shown in FIG. 6, when a coating ink is coated to form a film by such a coating method as the roll coating method in which shear stress acts in the direction parallel to the surface of the film formed, the thickness of the film is made larger than the particle diameters of the fine crystalline particles of calcite 4b; or a coating ink is coated to form a film by means of spray coating by controlling shear stress which acts in the direction parallel to the film formed. Further, the coating ink is thoroughly agitated before it is used for the coating.

The transparent resin 4c to be incorporated into the light-diffusing layer 4 is, like the transparent resin for use in the embodiment shown in FIG. 1, one of, or a mixture of two or more of transparent resins such as acrylic resin, polyester resin, polycarbonate resin, vinyl chloride-vinyl acetate copolymers and polyurethane resin.

Calcite is, like the calcite for use in the embodiment shown in FIG. 1, a transparent crystal of hexagonal system, having the chemical composition $CaCO_3$. Calcite which can be used in this embodiment may be a single or poly, idiomorphic or allotriomorphic, perfectly- or imperfectly-cleaved crystal, and an idiomorphic single crystal or perfectly-cleaved idiomorphic single crystal is preferably used.

Also in this embodiment, fine crystalline particles of calcite 4b having a mean particle diameter of 2 to 20 micrometers are used. It is preferable that the particle size distribution of the fine crystalline particles of calcite 4b be as narrow as possible when the optical properties are taken into consideration. For instance, when the fine crystalline particles of calcite 4b have a mean particle diameter of 5 micrometers, a desirable particle size distribution is such that 80% by weight or more of all of the particles have diameters ranging from 3 to 7 micrometers. A preferable amount of the fine crystalline particles of calcite 5a to be incorporated is from 10 to 30% by weight.

The following embodiment can be mentioned as an embodiment which can improve the image contrast in the light, while maintaining the luminance of reflected light high and the angle of diffusion wide: as shown in FIG. 6, the fine crystalline particles of calcite 4b are oriented and distributed in the light-diffusing layer 4 so that the flat surfaces of at least part of the fine crystalline particles of calcite 4b will not be parallel to the projection-light-receiving, image-observation surface 5B (typically, a case where the flat surfaces of the crystalline particles are randomly but isotropically orientated), and, at the same time, the flakes 3a are oriented in the light-reflecting layer 3 so that the flat surfaces of all of the flakes will be almost parallel to the image-observation surface 5B.

The surface of the light-diffusing layer 4 is the projection-light-receiving, image-observation surface 5B which receives incident projection light and on which an image to be observed is formed. This surface 5B can be made flat and smooth as shown in FIG. 5; or, when necessary, it can also be made rough by means of sandblasting or satinizing, or made into a concave or convex shape like a lenticular or Fresnel lens, thereby adjusting the angle distribution of the luminance of reflected light (light distribution properties).

Proper amounts of lubricants such as silicone resins and waxes, and of additives such as antistatic agents, thermal stabilizers and ultraviolet absorbers may also be added to the light-diffusing layer 4, if necessary.

The reflection-type projection screen 1B of this embodiment comprises the substrate 2, and the light-reflecting layer 3, the light-absorbing layer 8 and the light-diffusing layer 4 which are provided on the surface of the substrate 2 in this order, these four constituents being in a state of laminate. For this reason, the following effects can be obtained in addition to the previously-mentioned effects of the embodiment shown in FIG. 1.

In the screen of this embodiment, the light-absorbing layer 8 is formed between the light-diffusing layer 4 and the light-reflecting layer 3. It is thus possible to improve the contrast without decreasing the gain and the angle of visibility as compared with the reflection-type projection screen of the embodiment shown in FIG. 1. Namely, with respect to projection light $L_{S1}$ which forms a narrow angle with the normal, the length of the light path of projection light traveling in the light-absorbing layer 8 is short as shown in FIG. 6, and the amount of light attenuated in the light-absorbing layer 8 is thus small. On the other hand, with respect to noise light $L_{N2}$ which comes from the light-diffusing layer 4, the length of the light path of noise light traveling in the light-absorbing layer 8 is long, and the amount of light attenuated is therefore large. For this reason, the difference between the amount of projection light LS1, LS2, . . . and that of noise light $L_{N1}$, $L_{N2}$, . . . increases even in the light-absorbing layer 8. By this, the effect of improving the SN (signal/noise) ratio of projection light to noise light in the light-diffusing layer 4 is further increased.

EXAMPLE 3

An example of the reflection-type projection screen according to the embodiment shown in FIGS. 5 and 6 will now be explained by referring to FIGS. 5 and 6.

A composite sheet prepared by dry-laminating a white-colored biaxially-oriented polyethylene terephthalate film having a thickness of 125 micrometers, containing as a white pigment titanium white on the surface of a black-colored polyvinyl chloride sheet having a thickness of 300 micrometers, containing as a plasticizer 48 parts by weight of dioctyl adipate, and as a black pigment carbon black was used as the substrate 2. A light-reflecting layer 3 was formed on the surface of this substrate 2.

This light-reflecting layer 3 is a transparent layer made from polyurethane resin 3b containing 20% by weight of flakes 3a of aluminum, a light-reflective material.

The light-reflecting layer 3 was formed in the following manner: an ink was prepared by dispersing the flakes 3a and the polyurethane resin 3b in a solvent mixture consisting of toluene/MEK (methyl ethyl ketone)/IPA (isopropyl alcohol) so that the ink would have a solid content of 30 to 40%; and this ink was coated onto the substrate 2 to form a film in such a manner that the flat surfaces 3c of the flakes 3a would be almost parallel to the projection-light-receiving, image-observation surface 5 and that the thickness of the film after dried would be 5 micrometers, the coating being repeated twice so as to obtain a coating film having a total thickness of 10 micrometers. The flakes 3a were oriented in the light-reflecting layer 3 so that the flat surfaces 3c (surfaces having largest surface areas) of the flakes would be almost parallel to the film formed, as shown in FIG. 6.

Next, on the surface of the light-reflecting layer 3 thus formed, a light-absorbing layer 8 was formed. This light-absorbing layer 8 is a transparent layer made from polyurethane resin 8b containing 0.7% by weight of carbon black, an achromatic pigment 8a. The light-absorbing layer 8 was formed in the following manner: an ink was prepared by adding toluene/MEK (methyl ethyl ketone)/IPA (isopropyl alcohol) to the above-described solid components so that the ink would have a solid content of 30 to 40%; and this ink was coated onto the surface of the light-reflecting layer 3 by the gravure-roll coating method to form a layer having a thickness of 10 micrometers (when dried).

Further, a light-diffusing layer 4 was formed on the surface of the light-absorbing layer 8. This light-diffusing layer 4 was a transparent layer made from polyurethane resin 4c containing 20% by weight of fine crystalline particles of calcite 4b having a mean particle diameter of 4 micrometers, 70% of all of the particles having diameters ranging from 3 to 7 micrometers. The light-diffusing layer 4 was formed in the following manner: an ink was prepared by adding toluene/MEK (methyl ethyl ketone)/IPA (isopropyl alcohol) to the above-described solid components so that the ink would have a solid content of 30 to 40%; and this ink was coated onto the surface of the light-absorbing layer 8 by the gravure-roll coating method to obtain a layer having a thickness of 10 micrometers (when dried).

Thus, a reflection-type projection screen 1B of Example 3 was prepared.

EXAMPLE 4

The procedure of Example 3 was repeated except that a light-absorbing layer 8-1 having a composition different from that of the light-absorbing layer 8 formed in Example 3 was provided between the light-reflecting layer 3 and the light-diffusing layer 4. The light-absorbing layer 8-1 was a transparent layer made from polyurethane resin 8b containing 0.7% by weight of carbon black, an achromatic pigment, and 20% by weight of fine crystalline particles of calcite having a mean particle diameter of 4 micrometers, 70% of all of the particles having diameters ranging from 3 to 7 micrometers. This light-absorbing layer 8-1 was formed in the following manner: an ink was prepared by adding toluene/MEK (methyl ethyl ketone)/IPA (isopropyl alcohol) to the above-described solid components so that the ink would have a solid content of 30 to 40%; and this ink was coated onto the surface of the light-reflecting layer 3 by the gravure-roll coating method to obtain a layer having a thickness of 10 micrometers (when dried). Both of the light-reflecting layer 3 and the light-diffusing layer 4 in this example were the same as those in Example 3.

Thus, a reflection-type projection screen of Example 4 was prepared.

On the other hand, the reflection-type projection screen shown in FIG. 1 was prepared as a screen of Comparative Example 3. Namely, a light-reflecting layer 3 was formed on the surface of the substrate 2 as shown in FIG. 1. This light-reflecting layer 3 is a transparent layer made from polyurethane resin 3b containing 20% by weight of flakes 3a (mean particle diameter: 10 micrometers) of aluminum.

The light-reflecting layer 3 was formed in the following manner: an ink containing the flakes 3a and the polyurethane resin 3b was coated onto the surface of the substrate to form a film by the gravure-roll coating method in such a manner that the flat surfaces 3c of the flakes 3a would be almost parallel to the projection-light-receiving, image-observation surface 5 and that the thickness of the film after dried would be 5 micrometers, the coating being repeated twice so as to obtain a coating film having a total thickness of 10 micrometers. It is noted that the flakes 3a were oriented in the light-reflecting layer 3 so that the flat surfaces 3c (surfaces having largest surface areas) of the flakes would be almost parallel to the film formed.

A light-diffusing layer 4 was formed on the surface of this light-reflecting layer 8. The light-diffusing layer 4 was a transparent layer made from polyurethane resin 3b containing 0.7% by weight of carbon black, an achromatic pigment, and 20% by weight of fine crystalline particles of calcite 4b having a mean particle diameter of 4 micrometers, 70% of all of the particles having diameters ranging from 3 to 7 micrometers.

The light-diffusing layer 4 was formed in the following manner: an ink was prepared by adding toluene/MEK (methyl ethyl ketone)/IPA (isopropyl alcohol) to the above-described solid components so that the ink would have a solid content of 30 to 40%; and this ink was coated onto the surface of the light-reflecting layer 3 by the gravure-roll coating method to form a layer having a thickness of 10 micrometers (when dried). The orientation of the fine crystalline particles of calcite 4b in the light-diffusing layer 4 was almost random.

Thus, a reflection-type projection screen of Comparative Example 3 was prepared.

Further, as a conventional example, the reflection-type projection screen proposed in Japanese Patent Laid-Open Publication No. 53945/1992, one of the previously-mentioned conventional techniques, was prepared. Namely, the procedure of Comparative Example 3 for preparing the projection screen shown in FIG. 1 was repeated except that the flakes 3a of aluminum to be incorporated into the light-reflecting layer 3 were replaced by titanium dioxide (titanium white) powder and that the achromatic pigment 4a was not incorporated into the light-diffusing layer 4, thereby obtaining the desired reflection-type projection screen.

With respect to these samples (the screens of Example 3, Example 4, Comparative Example 3 and Conventional Example), the screen gain (reflection luminance), the angle of visibility and the contrast of a reflection image were respectively measured under the following test conditions.
(Screen Gain)

Onto the projection surface of the reflection-type projection screen, a white-colored solid image is projected by a projector. The luminance ($cd/m^2$) and the illuminance (1×) at the center of the projection surface are measured, and the screen gain is calculated from the equation: (screen gain)= π×(luminance/illuminance). It is noted that the distance between the projector and the screen was adjusted to 2 m and that the angles of projection light diffusing up- and downward, and right- and leftward in terms of the horizontal direction were adjusted to 30° each.

(Angle of Visibility)

A white-colored solid image is projected onto the screen under the same conditions as in the measurement of the screen gain. The dependence of luminance on angle (light distribution properties) is determined by horizontally scanning a luminance meter within the range of angle of −60° to +60° in terms of the normal drawn from the center of the screen. The angle of visibility is evaluated by the range of angle which covers ½ or more of the luminance along the normal, that is, the half value angle.

(Contrast of Reflection Image)

Two different images, that is, a black-colored solid image and a white-colored solid image, are projected onto the screen by a projector under the same conditions as in the above-described measurement of the screen gain. The contrast is obtained from the equation: (contrast)=(luminance on the screen surface receiving black signal)/(luminance on the screen surface receiving white signal), by converting the numerator into 1.

The results are shown in Table 4.

trast. Although the level of the contrast is acceptable for practical used, it is required to further improve the contrast.

The reflection-type projection screen of Conventional Example is inferior to the screens of Examples 3 and 4 in the reflection luminance, angle of visibility and contrast. It is thus understood that this conventional screen has poor properties as a reflection-type projection screen.

The fine crystalline particles of calcite 4b used in the embodiment shown in FIG. 1 absorb light slightly, and diffuse light moderately. However, the refractive index of the calcite particles is greater than that of the transparent resin 4c used for forming the light-diffusing layer 4. Moreover, in order that the calcite particles can show light-diffusing properties, they are required to have particle diameters at a certain level. For this reason, if it is tried to obtain a wider angle of visibility, the light-transmitting properties are impaired, and, as a result, the screen gain is decreased.

It was found to be possible to solve the above problem, that is, to improve the angle of visibility without impairing the light-transmitting properties by the incorporation of microsilica into the light-diffusing layer 4. Microsilica is usually used as an extender pigment or the like of an ink. It is, in general, spherical in shape, and has a mean particle diameter of not more than 5 micrometers (preferably not more than 3.5 micrometers) and a particle diameter distribution of 2 micrometers or less (preferably 0.5 micrometers

TABLE 4

| | | Conditions of preparation | | | | | | | | Results | | |
|---|---|---|---|---|---|---|---|---|---|---|---|---|
| | Subs- | Light-reflecting layer 3 | | Light-absorbing layer 8 | | | Light-diffusing layer 4 | | | | Angle of | |
| Sample | trate Shape | Flakes 3a | Type of resin 3b | Type of dye 4a | Type of resin 4b | Calcite | Calcite 5a | Type of resin 5b | Type of dye | Screen gain | visibility (°) | Contrast |
| Example 3 | Sheet | Aluminum, particle diameter 10 μm, 20 wt % | Poly-urethane | Carbon black, 0.7 wt % | Poly-urethane | None | Particle diameter, 4 μm, 20 wt % | Poly-urethane | None | 2.42 | 30.1 | 1/27.2 |
| Example 4 | ↑ | ↑ | ↑ | ↑ | ↑ | Particle diameter, 4 μm, 20 wt % | ↑ | ↑ | ↑ | 2.17 | 92.0 | 1/30.5 |
| Comparative Example 3 | ↑ | ↑ | ↑ | None | None | None | ↑ | ↑ | Carbon black, 0.7 wt % | 2.02 | 30.8 | 1/23.4 |
| Conventional Example | ↑ | Titanium dioxide | ↑ | ↑ | ↑ | ↑ | ↑ | ↑ | None | 1.53 | 31.5 | 1/14.3 |

The data shown in Table 4 demonstrate that the reflection-type projection screens of Examples 3 and 4 have high reflection luminances and wide angles of visibility, and, at the same, can form images thereon having high contrast between light and darkness. It can thus be known that these screens have properties very desirable as reflection-type projection screens.

Further, when the reflection-type projection screen of Example 3 or 4 is used, it is not necessary to use any other special device or element such as a polarized light filter or a polarization-type projector. The projection system can thus be simplified.

In particular, since the fine crystalline particles of calcite are incorporated into the light-absorbing layer 8 of the reflection-type projection screen of Example 4, the contrast is improved more greatly than in the case of Example 3.

On the other hand, the reflection-type projection screen of Comparative Example 3 is slightly insufficient in the conor less). The amount of microsilica to be incorporated into the light-diffusing layer 4 is from 0.5 to 30 parts by weight, preferably from 1.0 to 15 parts by weight.

When microsilica particles are incorporated into the light-diffusing layer 4 as in the case of the reflection-type projection screen 1C shown in FIG. 7, the light-diffusing properties of the fine crystalline particles of calcite 4b can be supplemented (the angle of visibility can be improved to a certain extent as compared with the case where only the fine crystalline particles of calcite are used), and, at the same time, a decrease on the screen gain can be made small as compared with the case where only the fine crystalline particles of calcite are used.

The microsilica particles 10 may be incorporated either into the light-reflecting layer 3 as in the case of the reflection-type projection screen 1D shown in FIG. 8, or into at least two constituents selected from the light-diffusing layer 4, the light-reflecting layer 3 and the substrate 2. In either case, the amount of the microsilica to be incorporated is desirably from 0.5 to 30 parts by weight.

Examples 5, 6, 7 and 8, and Comparative Example 4, in which microsilica is used, and the comparison of the effects of these examples will be shown below.

EXAMPLE 5

The procedure of the preparation of the reflection-type projection screen shown in FIG. 1 was repeated except that microsilica (mean particle diameter: 3.3 micrometers; particle diameter distribution: ±0.2 micrometers; shape: spherical) was incorporated into the light-diffusing layer 4 in an amount of 10 parts for 100 parts of the transparent resin 4c.

EXAMPLE 6

The procedure of the preparation of the reflection-type projection screen shown in FIG. 1 was repeated except that the microsilica used in Example 5 was incorporated into the light-reflecting layer 3 in an amount of 15 parts for 100 parts of the transparent resin 4c.

EXAMPLE 7

The procedure of the preparation of the reflection-type projection screen shown in FIG. 1 was repeated except that the microsilica used in Example 5 was incorporated into the light-diffusing layer 4 and the light-reflecting layer 3 in amounts of 8 parts and 2 parts, respectively.

EXAMPLE 8

The procedure of Example 7 was repeated except that the transparent resin 3b used for forming the light-reflecting layer 3 was changed from the urethane resin to a mixture of polyester resin (two-pack-type hardening resin to be hardened by an isocyanate hardening agent) and a vinyl chloride-vinyl acetate copolymer, that the solvent used for preparing the ink for forming the light-reflecting layer 3 was changed from the solvent mixture of toluene/MEK (methyl ethyl ketone)/IPA (isopropyl alcohol) to a solvent mixture of toluene/MEK, that the transparent resin 4c used for forming the light-diffusing layer 4 was changed from the urethane resin to a mixture of acrylic resin (two-pack-type hardening resin to be hardened by an isocyanate hardening agent) and a vinyl chloride-vinyl acetate copolymer, that the solvent used for preparing the ink for forming the light-diffusing layer 4 was changed from the solvent mixture of toluene/MEK (methyl ethyl ketone)/IPA (isopropyl alcohol) to a solvent mixture of toluene/MEK, that the surface of the biaxially-oriented terephthalate film used for preparing the substrate 2 was subjected to corona discharge treatment so as to impart adhesion-promoting properties to the surface, and that 0.6 parts by weight of the amino-modified silicone oil which was used as the lubricant 6 in Example 2 was added to the light-diffusing layer 4.

COMPARATIVE EXAMPLE 4

The procedure of the preparation of the reflection-type projection screen shown in FIG. 1 was repeated except that the amount of the fine crystalline particles of calcite to be incorporated was increased to 35 parts.

With respect to the samples of Examples 5, 6 and 7, and of Comparative Example 4, the screen gain and the angle of visibility were measured. As can be understood from the data shown in the below Table 5, the angle of visibility was successfully increased, while the screen gain was not decreased.

TABLE 5

| | Screen Gain | Angle of Visibility (°) |
|---|---|---|
| Example 5 | 1.96 | 35.5 |
| Example 6 | 2.00 | 33.9 |
| Example 7 | 2.00 | 35.0 |
| Example 8 | 2.05 | 35.1 |
| Comp. Ex. 4 | 1.45 | 37.2 |

Figure 9:
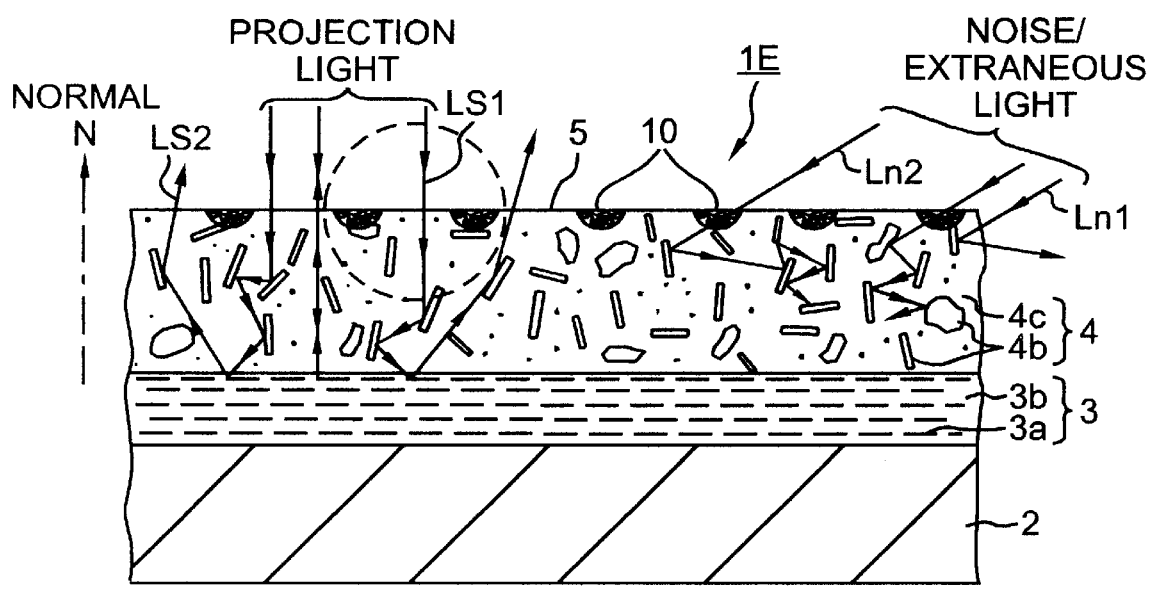
FIG. 9 is a diagrammatical sectional partial view of a reflection-type projection screen according to a sixth embodiment of the present invention.

FIG. 9 shows a 7th embodiment which can be attained by the modification of the embodiment shown in FIG. 3, wherein a patterned light-absorbing area 10, for example, reticulate one is provided on the surface 5 of the light-diffusing layer 4. The light-absorbing area 10 is a layer into which an achromatic pigment and/or dye is incorporated so that the layer can absorb light. In the case where the surface of the light-diffusing layer 4 has been made smooth, it is proper to form the patterned light-absorbing layer by such a printing method as the gravure printing method. Further, the patterned light-absorbing layer 10 can also be formed in the following manner: when the light-diffusing layer 4 is formed by the gravure printing method, the surface of the light-diffusing layer 4 is made rough by selecting the line of the gravure or the printing conditions; an ink containing an achromatic pigment and/or dye is coated onto this rough surface; and the ink deposited on the protruding parts of the rough surface is scraped off by such a technique as wiping, thereby obtaining a light-absorbing layer 10 patterned by the ink remaining only in the depressed parts of the rough surface. The light-absorbing layer 10 may also be a layer which transmits light, and, at the same time, absorbs a part of the light transmitted, just like the light-absorbing area 8. Further, the surface of the light-diffusing layer 4 can be made rough also by means of embossing, hairline processing, sandblasting or the like. It is preferable that the widths 1, of the depressed parts be made smaller than those 1, of the protruding parts and that the depths 1, of the depressed parts a be made greater than the widths of the same.

Figure 10:
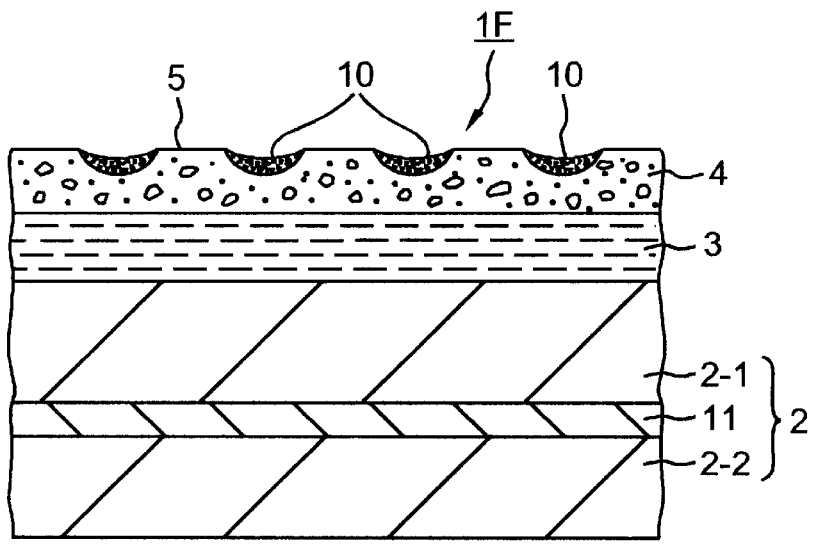
FIG. 10 is a diagrammatical sectional partial view showing an eighth embodiment of the present invention.
Figure 9A:
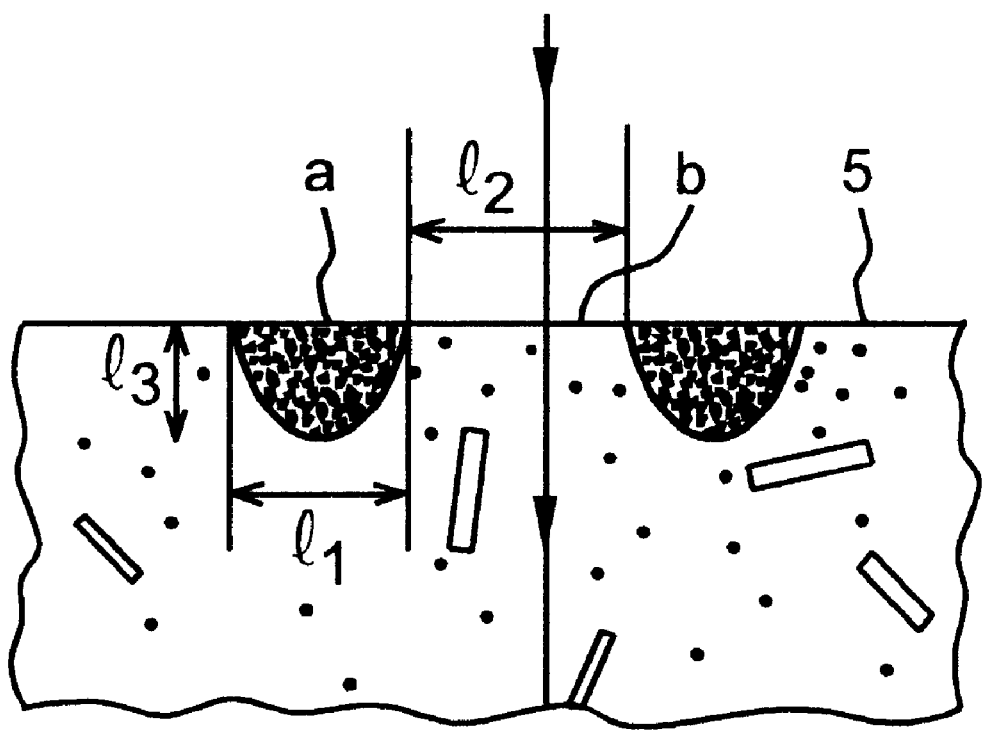
FIG. 9A is an enlarged view showing the details of the portion circled in FIG. 9.

The embodiment shown in FIG. 10 is an 8th embodiment, which can be attained by the modification of the embodiment shown in FIG. 9, wherein two sheet materials 2-1 and 2-2, an adhesive agent 11 being provided therebetween, are used instead of the substrate 2.

Figure 11:
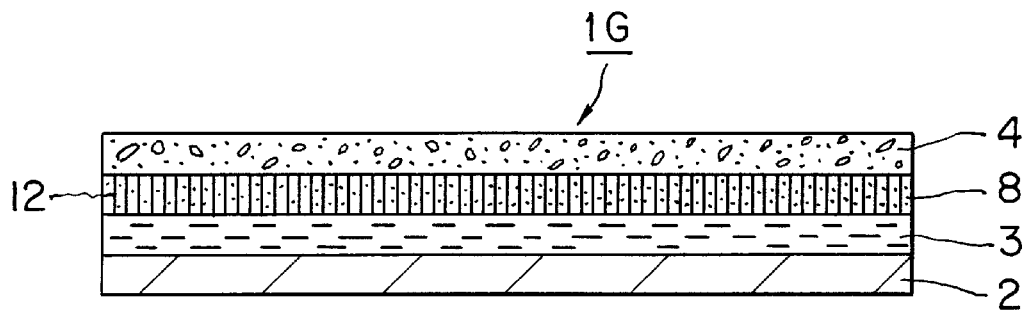
FIG. 11 is a diagrammatical sectional partial view showing a ninth embodiment of the present invention.
Figure 12:
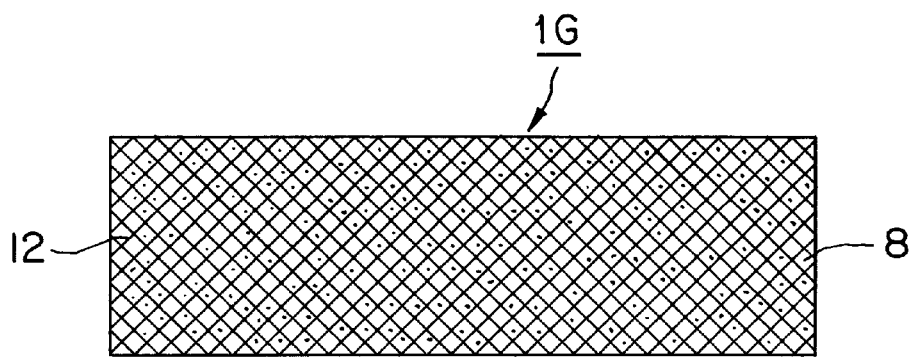
FIG. 12 is a cross-sectional view showing the light-absorbing layer of the reflection-type projection screen shown in FIG. 11.

FIG. 11 shows a 9th embodiment. This embodiment can be attained by the modification of the embodiment shown in FIG. 5, wherein a light-absorbing structure 12 is entirely provided to the light-absorbing layer 8. The light-absorbing structure 12 may be, for instance, a black-colored reticular structure as shown in FIG. 12, and is entirely formed in the light-absorbing layer 8 along the longitudinal direction thereof. The width and thickness of the line which forms each square mesh of the reticular structure are, for instance, 100 micrometers and 190 micrometers, respectively. With respect to the relationship between one side of the square mesh and the width of the line forming the square mesh, the proportion of the area of the opening of the black-colored reticular structure is from 50 to 95%, preferably from 70 to 85%, and the width of the line forming the square mesh is approximately 20 micrometers to 1 mm. It is preferable that the thickness of the mesh be greater than the width of the line forming the mesh. It is not necessary to make this network square, and it can be made into any shape or into stripes. This black-colored structure can be obtained by using, for instance, a net made from nylon or polypropylene fiber containing an achromatic (preferably, black) pigment or dye. Alternatively, the reticular structure can be obtained by printing a net-like pattern by such a printing method as the screen process printing by the use of an ink containing an achromatic (preferably, black) pigment or dye. The contrast of an image can be increased also by this embodiment.

Figure 13:
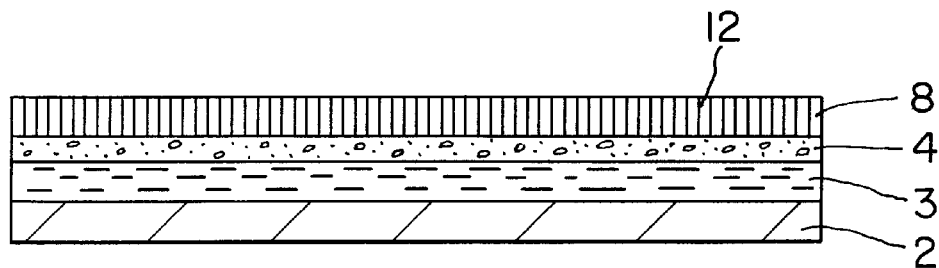
FIG. 13 is a diagrammatical sectional partial view showing a tenth embodiment of the present invention.

The 10th embodiment shown in FIG. 13 can be attained by the modification of the embodiment shown in FIG. 5, wherein the position of the light-diffusing layer 4 and that of the light-absorbing layer 8 are exchanged with each other so as to make the light-absorbing layer 8 the outermost layer. Moreover, a reticular light-absorbing structure 12 is provided to the light-absorbing layer 8 as in the case of the embodiment shown in FIG. 11. In this embodiment, the image contrast is increased due to the presence of the reticular light-absorbing structure 12. Even if the light-absorbing structure 12 is omitted, the same effects as those obtained by the embodiment shown in FIG. 5 can be obtained.

The 11th embodiment shown in FIG. 14 can be attained by the modification of the embodiment shown in FIG. 1, wherein a light-shielding/light-reflecting layer 13 is provided between the light-reflecting layer 3 and the substrate 2. This layer 13 is a white-colored solid layer, and can be formed by means of gravure coating. One example of the white-colored solid layer 13 is a layer having a thickness of approximately 3 micrometers, formed by using "XEL White" (acryl/vinyl chloride acetate resin into which a titanium oxide white pigment has been incorporated) manufactured by The Ink Tech Co., Ltd., Japan. The screen gain is increased due to the presence of this white-colored solid layer 13.

FIG. 15 shows an 12th embodiment. This embodiment can be attained by the modification of the embodiment shown in FIG. 1, wherein a transparent substrate layer 15 and a white-colored adhesive layer 16 are provided between the light-reflecting layer 3 and the substrate 2. The white-colored adhesive layer 16 can be formed by using an adhesive agent into which a titanium oxide white pigment has been incorporated. This layer is useful for bonding the transparent substrate layer 15 to the substrate 2, and, at the same time, serves as a reflected-light-shielding layer. A screen gain higher than that obtained by the embodiment shown in FIG. 14 can be obtained by this embodiment.

What is claimed is:

1. A reflection-type projection screen, comprising:
   a light-reflecting layer;
   a light-diffusing layer including a projection-light-receiving surface and a light-reflecting surface;
   an achromatic-light-absorbing means;
   said light-reflecting layer comprising a layer made from a transparent resin and having flakes of a light-reflective material with flat surfaces dispersed therein in a manner that the flat surfaces are substantially parallel to said projection-light-receiving surface;
   said light-diffusing layer comprising a layer made from a transparent resin and having fine crystalline particles of calcite with flat surfaces dispersed therein in a manner that the flat surfaces of at least a portion of the calcite particles are not parallel to said projection-light-receiving surface; and
   said achromatic-light absorbing means being selected from the group consisting of:
   (i) an achromatic pigment, a dye, or a combination thereof, dispersed in said light-diffusing layer,
   (ii) an achromatic pigment, a dye, or a combination thereof dispersed in said light-diffusing layer, and a layer provided between said light-diffusing layer and said light-reflecting layer and comprising a transparent resin and an achromatic pigment, a dye, or a combination thereof, dispersed in the transparent resin,
   (iii) a patterned light-absorbing layer provided on the projection-light-receiving surface side of said light-diffusing layer,
   (iv) a patterned light-absorbing layer provided on the light-reflecting surface side of said light-diffusing layer, and
   (v) a layer provided between said light-diffusing layer and said light-reflecting layer and comprising a transparent resin and an achromatic pigment, a dye, or a combination thereof, dispersed in the transparent resin.

2. The reflection-type projection screen according to claim 1, wherein the light reflective material comprises a metal.

3. The reflection-type projection screen according to claim 1, wherein the light-reflective material comprises an aluminum foil.

4. The reflection-type projection screen according to claim 1, wherein said projection-light-receiving surface comprises a substantially even surface.

5. The reflection-type projection screen according to claim 1, wherein said projection-light-receiving surface comprises a substantially uneven surface.

6. The reflection-type projection screen according to claim 1, further comprising a lubricating agent provided in one of the layers on the light-receiving side of the screen.

7. The reflection-type projection screen according to claim 6, wherein said lubricating agent comprises an organosilicic compound.

8. The reflection-type projection screen according to claim 6, wherein said lubricating agent comprises a fluororesin powder.

9. The reflection-type projection screen according to claim 6, wherein said lubricating agent comprises a polyolefin resin powder.

10. The reflection-type projection screen according to claim 1, wherein the amount of the achromatic pigment, the dye, or a combination thereof, provided in said light-absorbing layer comprises from 0.01 to 5% by weight.

11. The reflection-type projection screen according to claim 1, wherein the calcite particles comprise a mean particle diameter of about 2 to 20 micrometers.

12. The reflection-type projection screen according to claim 1, wherein said light-diffusing layer comprises microsilica particles.

13. The reflection-type projection screen according to claim 1, wherein said light-reflecting layer comprises microsilica particles.

14. The reflection-type projection screen according to claim 1, wherein said light-reflecting layer and said light-diffusing layer comprise coating layers on a substrate.

15. A reflection-type projection screen, comprising:
    a substrate;
    first, second and third coating layers on said substrate;
    said first coating layer comprising a light-reflecting layer of a coating composition comprising a transparent resin and a light-reflective material;
    said second coating layer comprising a light-diffusing layer of a coating composition comprising a transparent resin and fine crystalline particles of calcite said light-diffusing layer having an uneven surface having depressed and protruding parts; and said third coating layer comprising a patterned light-absorbing layer on only the depressed parts of said second coating layer of a coating composition comprising a transparent resin and an achromatic pigment, a dye, or a combination thereof.

16. A reflection-type projection screen, comprising:

a substrate;

first, second and third coating layers on said substrate;

said first coating layer comprising a light-reflecting layer of a coating composition comprising a transparent resin and a light-reflective material;

said second coating layer comprising a light-diffusing layer having an uneven surface of a coating composition comprising a transparent resin and fine crystalline particles of calcite, said coating composition having an uneven surface having depressed and protruding parts; and said third coating layer comprising a patterned light-absorbing layer on only the depressed parts of said second coating layer of a coating composition comprising a transparent resin and an achromatic pigment, a dye, or a combination thereof.

17. The reflection-type projection screen according to claim 16, wherein the widths of the depressed parts are smaller than the depths thereof.

* * * * *